US011827459B2

(12) United States Patent
Morrissey et al.

(10) Patent No.: US 11,827,459 B2
(45) Date of Patent: Nov. 28, 2023

(54) CONTROL OF CONVEYOR SYSTEMS USING HYDRAULICALLY AMPLIFIED SELF-HEALING ELECTROSTATIC (HASEL) ACTUATORS

(71) Applicant: Artimus Robotics Inc., Boulder, CO (US)

(72) Inventors: Timothy G. Morrissey, Boulder, CO (US); Eric Lucas Acome, Longmont, CO (US); Shane Karl Mitchell, Boulder, CO (US)

(73) Assignee: Artimus Robotics Inc., Boulder, CO (US)

( * ) Notice: Subject to any disclaimer, the term of this patent is extended or adjusted under 35 U.S.C. 154(b) by 94 days.

(21) Appl. No.: 17/504,464

(22) Filed: Oct. 18, 2021

(65) Prior Publication Data

US 2022/0119202 A1 Apr. 21, 2022

Related U.S. Application Data

(60) Provisional application No. 63/093,066, filed on Oct. 16, 2020.

(51) Int. Cl.
*B65G 43/08* (2006.01)
*B65G 13/075* (2006.01)
(Continued)

(52) U.S. Cl.
CPC ............. *B65G 43/08* (2013.01); *B65G 13/07* (2013.01); *B65G 13/071* (2013.01); *B65G 13/075* (2013.01); *F15B 21/065* (2013.01)

(58) Field of Classification Search
CPC ....... F15B 21/065; B65G 43/08; B65G 13/07; B65G 13/071; B65G 13/075; B65G 47/268
(Continued)

(56) References Cited

U.S. PATENT DOCUMENTS

| 3,770,102 A | * | 11/1973 | DeGood | B65G 47/261 |
| | | | | 198/781.06 |
| 4,273,239 A | * | 6/1981 | Thwaites | B65G 47/261 |
| | | | | 198/781.06 |

(Continued)

FOREIGN PATENT DOCUMENTS

| CN | 103563012 A | 2/2014 |
| DE | 102011080149 A1 | 1/2013 |

(Continued)

OTHER PUBLICATIONS

International Search Report; PCT/US2018/02379; dated Aug. 23, 2018.

(Continued)

*Primary Examiner* — James R Bidwell
(74) *Attorney, Agent, or Firm* — Neugeboren O'Dowd PC

(57) ABSTRACT

The present disclosure describes new systems and methods for influencing the rotational speed of a roller or other conveying systems and for controlling the speed, orientation or position of objects on a conveyor through the use of hydraulically amplified self-healing electrostatic (HASEL) actuators. HASEL actuators for such systems provide distinct benefits over traditional braking systems including: electrical control, eliminated need for an external source of pressurized air or fluid to allow use in certain environments, analog control of force or displacement in order to provide variable control of speed of objects on the conveyor system, and feedback to infer information about the state of the actuators as well as the state of objects being conveyed and/or state of the conveyor rollers.

14 Claims, 17 Drawing Sheets

(51) Int. Cl.
*F15B 21/06* (2006.01)
*B65G 13/071* (2006.01)
*B65G 13/07* (2006.01)

(58) Field of Classification Search
USPC .................. 198/345.3, 781.03, 832.2, 832.3
See application file for complete search history.

(56) References Cited

U.S. PATENT DOCUMENTS

| | | | |
|---|---|---|---|
| 4,502,593 A * | 3/1985 | van den Goor | B65G 47/261 |
| | | | 198/781.03 |
| 5,581,192 A | 12/1996 | Shea et al. | |
| 5,846,238 A | 12/1998 | Jackson et al. | |
| 5,853,411 A | 12/1998 | Whayne et al. | |
| 5,871,483 A | 2/1999 | Jackson et al. | |
| 5,891,135 A | 4/1999 | Jackson et al. | |
| 6,223,888 B1 * | 5/2001 | Jahns | B65G 47/261 |
| | | | 198/781.09 |
| 6,343,129 B1 | 1/2002 | Pelrine et al. | |
| 6,376,971 B1 | 4/2002 | Pelrine et al. | |
| 6,543,110 B1 | 4/2003 | Pelrine et al. | |
| 6,626,416 B2 | 9/2003 | Sharma et al. | |
| 6,806,621 B2 | 10/2004 | Heim et al. | |
| 6,940,211 B2 | 9/2005 | Pelrine et al. | |
| 7,046,497 B1 | 5/2006 | Bonin | |
| 7,456,549 B2 | 11/2008 | Heim et al. | |
| 7,468,575 B2 | 12/2008 | Pelrine et al. | |
| 7,667,946 B2 | 2/2010 | Choi et al. | |
| 7,841,461 B2 * | 11/2010 | Nguyen | B65G 21/14 |
| | | | 198/781.09 |
| 7,923,064 B2 | 4/2011 | Pelrine et al. | |
| 7,971,850 B2 | 7/2011 | Heim et al. | |
| 8,042,264 B2 | 10/2011 | Rosenthal et al. | |
| 8,093,783 B2 | 1/2012 | Rosenthal et al. | |
| 8,408,384 B2 * | 4/2013 | Rogers | B65G 13/075 |
| | | | 198/781.08 |
| 8,410,695 B1 | 4/2013 | Wedding et al. | |
| 8,508,109 B2 | 8/2013 | Pelrine et al. | |
| 8,981,621 B2 | 3/2015 | Pelrine et al. | |
| RE45,464 E | 4/2015 | Kornbluh et al. | |
| 10,302,586 B2 | 5/2019 | Sun et al. | |
| 10,631,083 B1 | 4/2020 | Gandhi et al. | |
| 10,640,033 B1 | 5/2020 | Gandhi et al. | |
| 10,859,101 B2 | 12/2020 | Rowe | |
| 10,995,779 B2 | 5/2021 | Keplinger et al. | |
| 11,408,452 B2 | 8/2022 | Keplinger et al. | |
| 2001/0026165 A1 | 10/2001 | Pelrine et al. | |
| 2001/0032663 A1 | 10/2001 | Pelrine et al. | |
| 2001/0035723 A1 | 11/2001 | Pelrine et al. | |
| 2001/0036790 A1 | 11/2001 | Kornbluh et al. | |
| 2002/0008445 A1 | 1/2002 | Pelrine et al. | |
| 2002/0050769 A1 | 5/2002 | Pelrine et al. | |
| 2002/0185937 A1 | 12/2002 | Heim et al. | |
| 2007/0170431 A1 * | 7/2007 | Choi | G02F 1/136227 |
| | | | 257/66 |
| 2009/0115285 A1 | 5/2009 | Najafi et al. | |
| 2010/0013356 A1 | 1/2010 | Heydt et al. | |
| 2010/0026143 A1 | 2/2010 | Pelrine et al. | |
| 2010/0033196 A1 | 2/2010 | Hayakawa et al. | |
| 2010/0087778 A1 | 4/2010 | Genosar et al. | |
| 2010/0164324 A1 | 7/2010 | Kim et al. | |
| 2010/0176322 A1 | 7/2010 | Heim et al. | |
| 2010/0263181 A1 | 10/2010 | Rosenthal et al. | |
| 2011/0025170 A1 | 2/2011 | Rosenthal et al. | |
| 2011/0154641 A1 | 6/2011 | Pelrine et al. | |
| 2011/0155307 A1 | 6/2011 | Pelrine et al. | |
| 2012/0169184 A1 | 7/2012 | Pelrine et al. | |
| 2014/0004364 A1 | 1/2014 | Takahashi et al. | |
| 2014/0338458 A1 | 11/2014 | Wang et al. | |
| 2018/0159022 A1 | 6/2018 | Krause et al. | |
| 2019/0020288 A1 | 1/2019 | Mäkinen et al. | |
| 2020/0079245 A1 | 3/2020 | Rowe et al. | |
| 2020/0130202 A1 | 4/2020 | Gandhi et al. | |
| 2020/0132223 A1 | 4/2020 | Prokhorov et al. | |
| 2020/0136525 A1 | 4/2020 | Gandhi et al. | |
| 2020/0136526 A1 | 4/2020 | Gandhi et al. | |
| 2020/0256357 A1 * | 8/2020 | Rowe | F15B 15/10 |
| 2021/0172460 A1 | 6/2021 | Keplinger et al. | |

FOREIGN PATENT DOCUMENTS

| | | | |
|---|---|---|---|
| EP | 1371130 A2 | 12/2003 | |
| EP | 1481467 A1 | 12/2004 | |
| EP | 1512215 A1 | 3/2005 | |
| EP | 1481467 B1 | 6/2010 | |
| EP | 2264801 A2 | 12/2010 | |
| EP | 2264801 A3 | 5/2011 | |
| EP | 1512215 B1 | 8/2011 | |
| EP | 2362458 A2 | 8/2011 | |
| EP | 1259992 B1 | 10/2011 | |
| EP | 2362458 A3 | 5/2012 | |
| EP | 1848046 B1 | 10/2012 | |
| EP | 2770510 A1 | 8/2014 | |
| EP | 2993480 A1 | 3/2016 | |
| EP | 3643929 A1 | 4/2020 | |
| EP | 3988450 * | 4/2022 | ........... B65G 13/075 |
| ES | 2356146 T3 | 4/2011 | |
| ES | 2369532 | 12/2011 | |
| ES | 2394160 | 1/2013 | |
| ES | 2394501 | 2/2013 | |
| JP | 2001524278 A | 11/2001 | |
| JP | 2003505865 A | 2/2003 | |
| JP | 2003506858 A | 2/2003 | |
| JP | 2003526213 A | 9/2003 | |
| JP | 2005522162 A | 7/2005 | |
| JP | 2007097292 A | 4/2007 | |
| JP | 4388603 B2 | 12/2009 | |
| JP | 4408415 B2 | 2/2010 | |
| JP | 4939577 B2 | 5/2012 | |
| JP | 2013102681 A | 5/2013 | |
| JP | 2014014266 A | 1/2014 | |
| KR | 1020090009616 A | 1/2009 | |
| KR | 100924231 B1 | 11/2009 | |
| KR | 100969710 B1 | 7/2010 | |
| KR | 1020140007955 A | 1/2014 | |
| WO | 9835529 A2 | 8/1998 | |
| WO | 9835529 A3 | 12/1998 | |
| WO | 01/06575 | 1/2001 | |
| WO | 01/06579 | 1/2001 | |
| WO | 0106579 A3 | 1/2002 | |
| WO | 02071592 A2 | 9/2002 | |
| WO | 02071592 A3 | 10/2003 | |
| WO | 2009015151 A1 | 1/2009 | |
| WO | 2009048952 A1 | 4/2009 | |
| WO | 2013058237 A1 | 4/2013 | |
| WO | 2015023803 A1 | 2/2015 | |
| WO | 2018175741 A1 | 9/2018 | |
| WO | 2019002860 A1 | 1/2019 | |
| WO | 2019166635 A1 | 9/2019 | |
| WO | 2019173227 A1 | 9/2019 | |
| WO | 2020086325 A1 | 4/2020 | |
| WO | 2022050997 A2 | 3/2022 | |
| WO | 2022050997 A9 | 4/2022 | |
| WO | 2022050997 A3 | 6/2022 | |

OTHER PUBLICATIONS

Kellaris, et al.; An analytical model for the design of Peano-HASEL actuators with drastically improved performance; Extreme Mechanics Letters; 29; 2019; 100449.

McMahon et al.; Area-of-Effect Softbots (AoES) for Asteroid Proximity Operations; IEEE, 2019.

Mitchell, et al.; An Easy-to-Implement Toolkit to Create Versatile and High-Performance HASEL Actuators for Untethered Soft Robots; Adv. Sci.; 2019, 6, 1900178.

O'Neill et al.; Rapid 3D Printing of Electrohydraulic (HASEL) Tentacle Actuators; Adv. Funct. Mater.; 2020; 2005244.

Panwar, et al.; Simulation-driven design to reduce pull-in voltage of donut HASSEL actuators; Proc. SPIE 10966; EAPAD XXI 1096622; Mar. 13, 2019.

(56) References Cited

OTHER PUBLICATIONS

Rothemund et al.; How Inhomogeneous Zipping Increases the Force Output of Peano-HASEL Actuators; https//www.sciencedirect.com/article/pii/S2352431619301233; pub. Elsevier; 2019.
Rothemund, et al.; Dynamics of electrohydraulic soft actuators; PNAS; vol. 117; No. 28; Jul. 14, 2020; pp. 16207-16213.
Schunk, et al.; System Identification and Closed Loop Control of a Hydraulically Amplified Self-Healing Electrostatic (HASEL) Actuator; IEEE/RSJ Int'l. Conf. on Intelligent Robots and Systems; Madrid, Spain; Oct. 1-5, 2018.
Wang et al.; High strain Peano-HASEL actuators; doi:10.1002/adfm.201908821; Dec. 15, 2019.
Acome, Eric et al., Hydraulically amplified self-healing electrostatic actuators with muscle-like performance, Science 359, pp. 61-65, (2018).
Extended European Search Report for European Application No. 19763827.3, dated Oct. 25, 2021.
Extended European Search Report, dated Nov. 24, 2020, PCT US/2018/023797.
Gabriel, K.J., Surface Normal Electrostatic/Pneumatic Actuator, Feb. 4-7, 1992, pp. 128-132, Micro Electro Mechanical Systems '92, Travemunde, Germany.
International Preliminary Report on Patentability, PCT/US20/020978, dated Aug. 25, 2021.
International Preliminary Report on Patentability, PCT/US20/020986, dated Aug. 25, 2021.
International Search Report and Written Opinion for International Application No. PCT/US20/20978, Search completed May 7, 2020, dated Jun. 29, 2020, 18 Pgs.
International Search Report and Written Opinion, PCT/US21/35041, dated Mar. 1, 2022.
ISR and Written Opinion of the ISA, dated Jun. 21, 2019, PCT/US2019/020568.
Kellaris, Nicholas et al., Peano-HASEL actuators: Mucsclemimetic, electrohydraulic transducers that lineraly contract on activation, Sci. Robot. 3, eaar 3276, (2018).
Notice of Allowance, U.S. Appl. No. 16/496,234, dated Apr. 5, 2021.
Notice of Allowance, U.S. Appl. No. 16/978,292, dated Feb. 25, 2022.
Notice of Allowance, U.S. Appl. No. 17/198,909, dated Apr. 4, 2022.
Lazo, Thomas E., "Notice of Allowance for U.S. Appl. No. 17/883,284," dated Jun. 13, 2023, 5 Pages.

\* cited by examiner

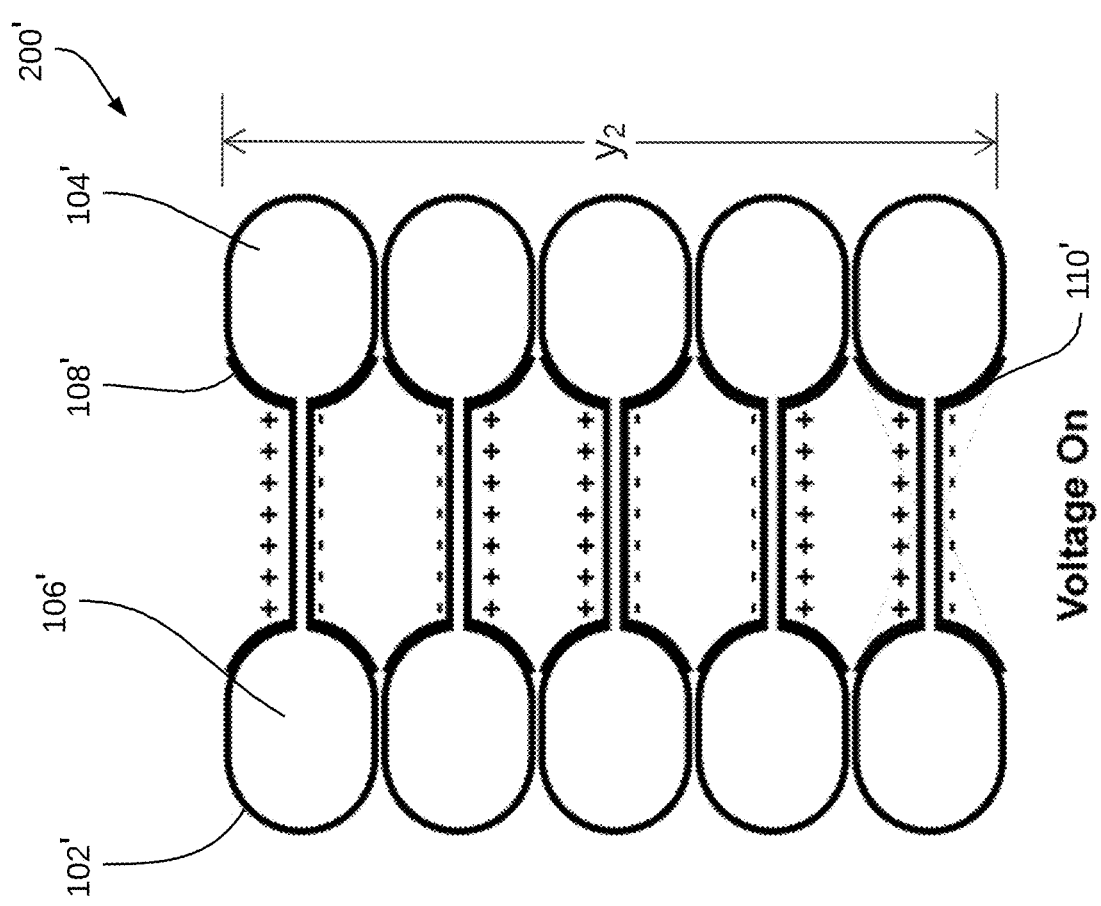
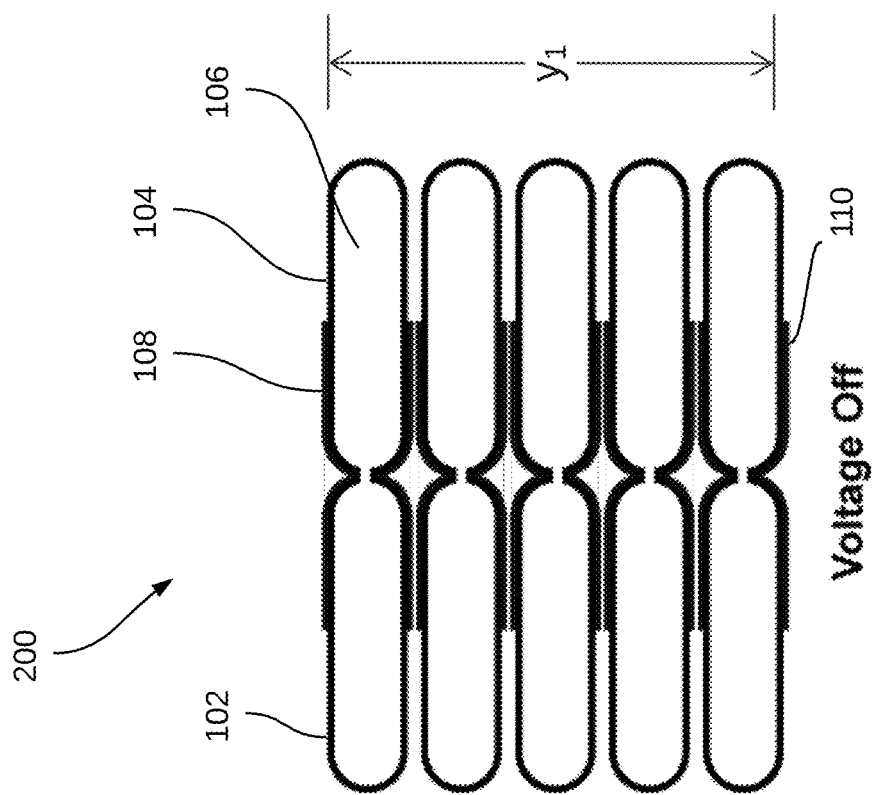

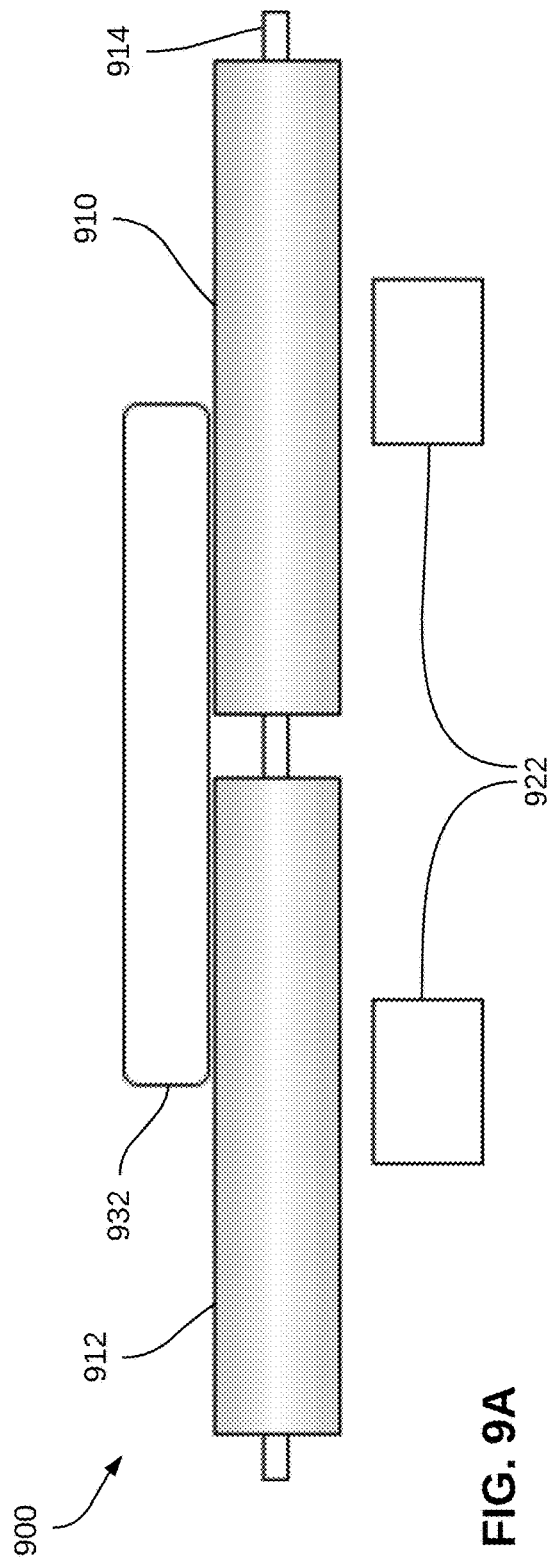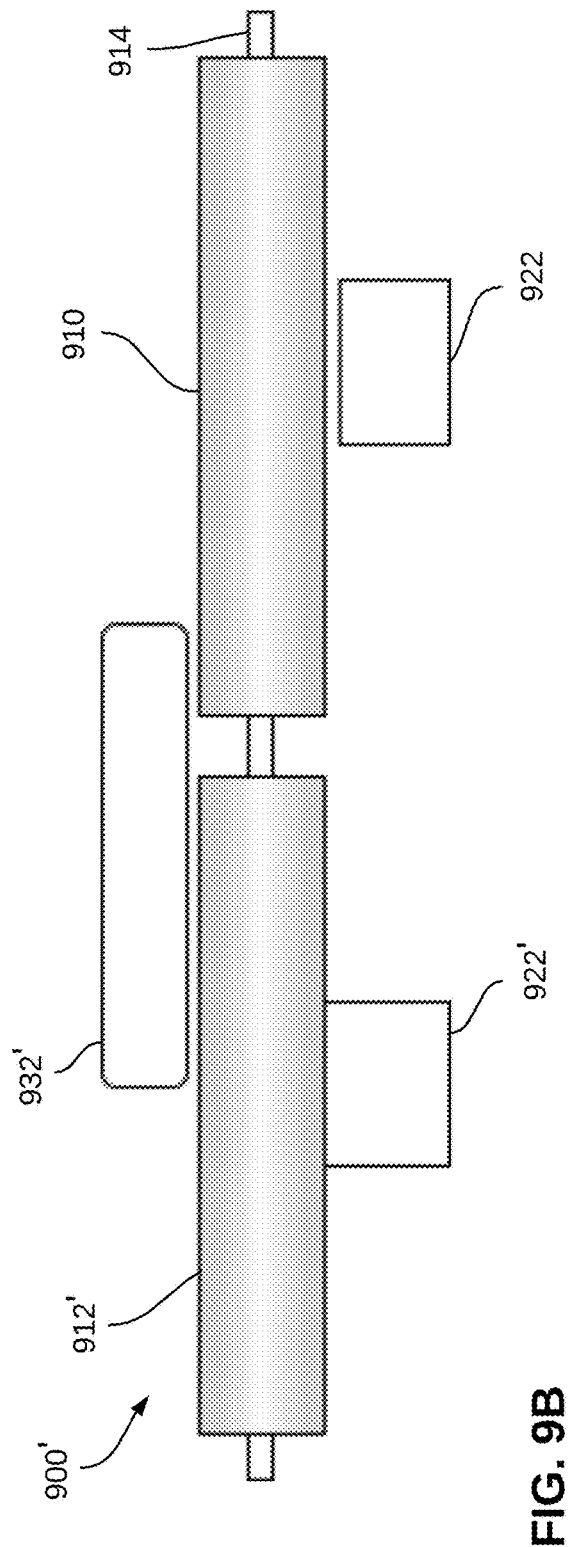
FIG. 9A
FIG. 9B

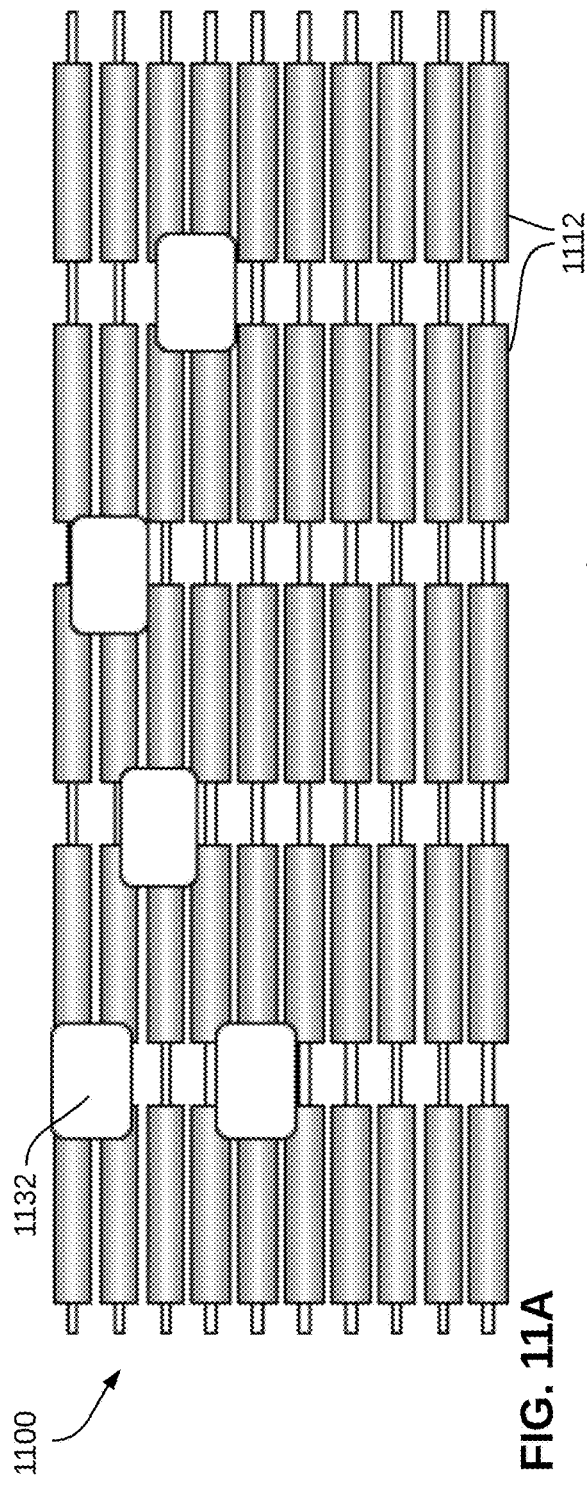
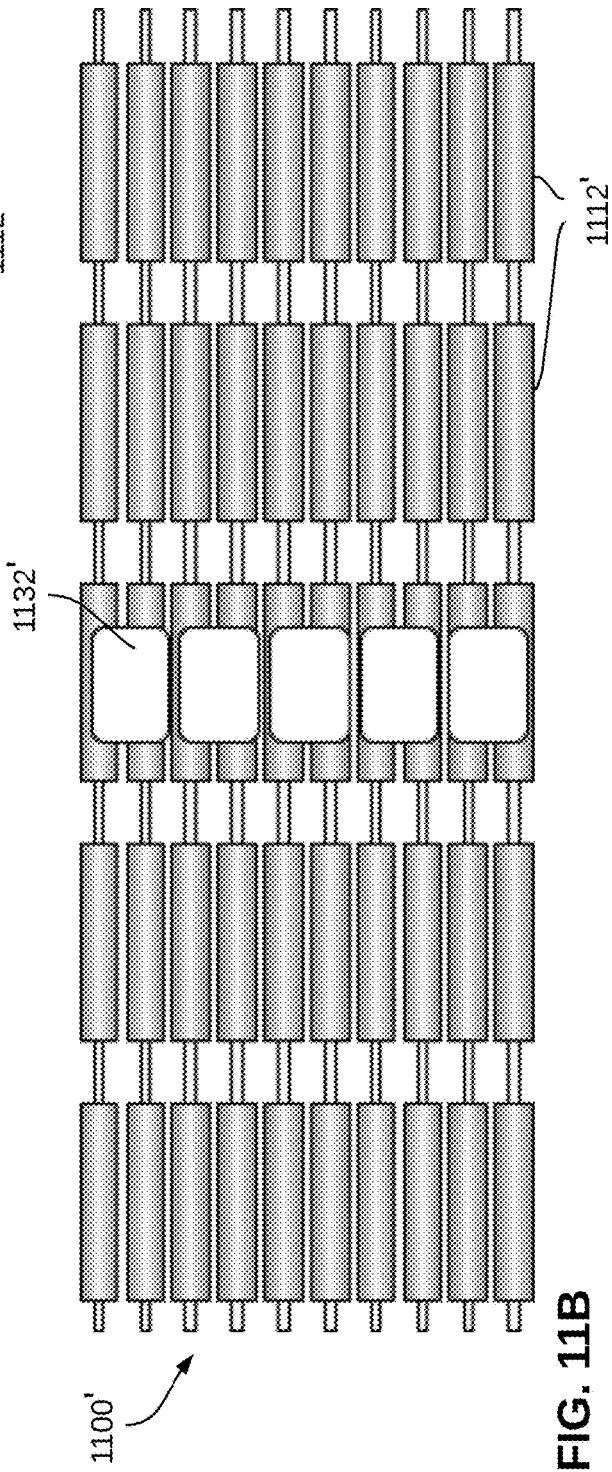
FIG. 11A
FIG. 11B

CONTROL OF CONVEYOR SYSTEMS USING HYDRAULICALLY AMPLIFIED SELF-HEALING ELECTROSTATIC (HASEL) ACTUATORS

CROSS REFERENCE TO RELATED APPLICATIONS

The present application claims the benefit of U.S. Provisional Patent Application No. 63/093,066, filed Oct. 16, 2020, and entitled "CONTROL OF CONVEYOR SYSTEMS USING HYDRAULICALLY AMPLIFIED SELF-HEALING ELECTROSTATIC (HASEL) ACTUATORS". Additionally, this disclosure relates to PCT Publication No. WO 2018/175741 entitled "HYDRAULICALLY AMPLIFIED SELF-HEALING ELECTROSTATIC TRANSDUCERS" filed on Mar. 22, 2018; PCT Application No. PCT/US2019/020568 entitled "HYDRAULICALLY AMPLIFIED SELF-HEALING ELECTROSTATIC TRANSDUCERS HARNESSING ZIPPING MECHANISM" filed on Mar. 4, 2019; PCT Application No. PCT/US20/20986 entitled "FOLDABLE FILLING FABRICATION AND COMPOSITE LAYERING OF HYDRAULICALLY AMPLIFIED SELF-HEALING ELECTROSTATIC TRANSDUCERS" filed on Mar. 4, 2020; PCT Application No. PCT/US20/20978 entitled "COMPOSITE LAYERING OF HYDRAULICALLY AMPLIFIED SELF-HEALING ELECTROSTATIC TRANSDUCERS" filed on Mar. 4, 2020; and U.S. Provisional Patent App. 63/032,209 entitled "CAPACITIVE SELF-SENSING FOR ELECTROSTATIC TRANSDUCERS WITH HIGH VOLTAGE ISOLATION" filed on May 29, 2020, the entirety of each of the foregoing incorporated by reference herein.

SUMMARY OF THE DISCLOSURE

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In an aspect, a system for selectively adjusting rotational speed of a roller is described, in accordance with an embodiment. The system includes a first roller configured to rotate about an axis, and a first actuator configured to selectively expand or tilt into contact with the first roller, thereby applying a first friction force to resist rotation of the first roller about the axis. The first actuator includes a compliant shell defining an enclosed cavity, a dielectric fluid disposed within the enclosed cavity, a first electrode disposed on a first side of the compliant shell, and a second electrode disposed on a second side of the compliant shell opposite the first side.

In another aspect, a system for selectively controlling rotational speed of a conveyor roller is disclosed. The system includes at least one conveyor roller, at least one pressure roller, and a drive belt. The drive belt includes a first side and a second side opposite the first side, wherein the first side faces the at least one conveyor roller and the second side is in contact with the at least one pressure roller. At least one actuator is configured to selectively position the first side of the drive belt such that the first side of the drive belt contacts the at least one conveyor roller.

In another aspect, a system for manipulating moving objects is described, in accordance with an embodiment. The system includes a first actuator configured to selectively expand into contact with a first moving object. The first actuator includes a compliant shell defining an enclosed cavity, a dielectric fluid disposed within the enclosed cavity, a first electrode disposed on a first side of the compliant shell, and a second electrode disposed on a second side of the compliant shell opposite the first side.

BRIEF DESCRIPTION OF THE DRAWINGS

The appended drawings illustrate only some implementation and are therefore not to be considered limiting of scope.

FIGS. 2A-2B illustrate cross-sectional views of a system of HASEL actuators joined together to amplify performance, in accordance with an embodiment.

FIGS. 9A-9B illustrate the front view of the use of at least one HASEL actuator to influence a portion of a roller by direct contact with a portion of the roller, to rotate or move the object on the conveying surface, in accordance with an embodiment.

FIGS. 11A-11B illustrate the top view of a matrix of conveyor rollers, each being influenced by a matrix of at least one HASEL actuator to influence an object or series of objects, in accordance with an embodiment.

DETAILED DESCRIPTION

Figure 1A:
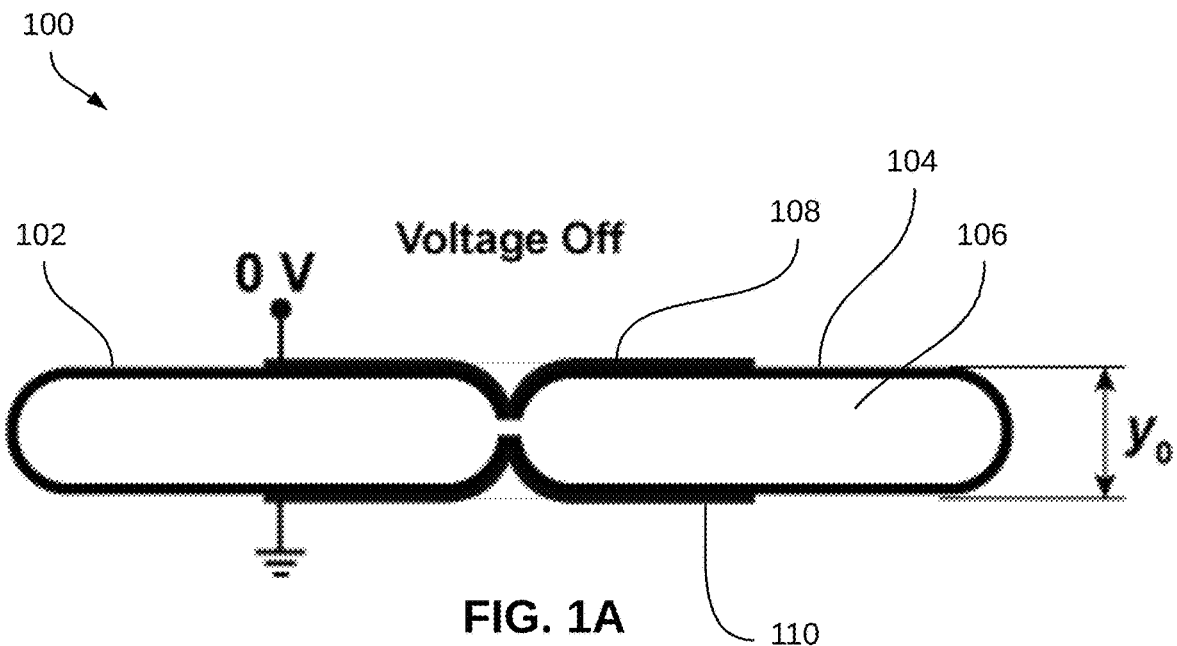
FIGS. 1A-1B illustrate a simplified cross section of a HASEL actuator in both the on and off state, respectively, in accordance with an embodiment.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "compromising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Conveyor systems are critical in many manufacturing and logistics applications. Modern conveyor systems require flexibility and granular control of various regions of the conveyor in order to provide a high level of control over the objects being conveyed. Currently, flexible and granular control is achieved by independent control of individual motors, or sections of the conveyor will be physically manipulated using a preferential braking system. Preferential braking systems may act directly on rollers, directly on objects, or may act directly on belts that drive conveyor zones. Often the conveyor braking system will be activated through the use of compressed air (pneumatics) or rigid electrically driven motors. While pneumatic actuators have a low upfront cost, the operating cost for operating pneumatic actuators can account for as much as 75% of a facility's operating cost. Pneumatic actuators require valves and long lengths of tubing which are inefficient and must be constantly supplied air from a large and loud compressor. Actuators often malfunction due to air leaks that are difficult to locate which adds to maintenance and operating costs. Motor driven systems do not require compressed air, however they have high upfront cost and consist of many moving components that require regular maintenance. Here we describe a new method for influencing the rotational speed of a roller or other conveying systems; and for controlling the speed, orientation or position of objects on a conveyor through the use of HASEL actuators. HASEL actuators for such systems provide distinct benefits over traditional braking systems including: electrical control, eliminated need for an external source of pressurized air or fluid to allow use in certain environments, analog control of force or displacement in order to provide variable control of speed of objects on the conveyor system, and feedback to infer information about the state of the actuators as well as the state of objects being conveyed and/or state of the conveyor rollers.

Figure 1B:
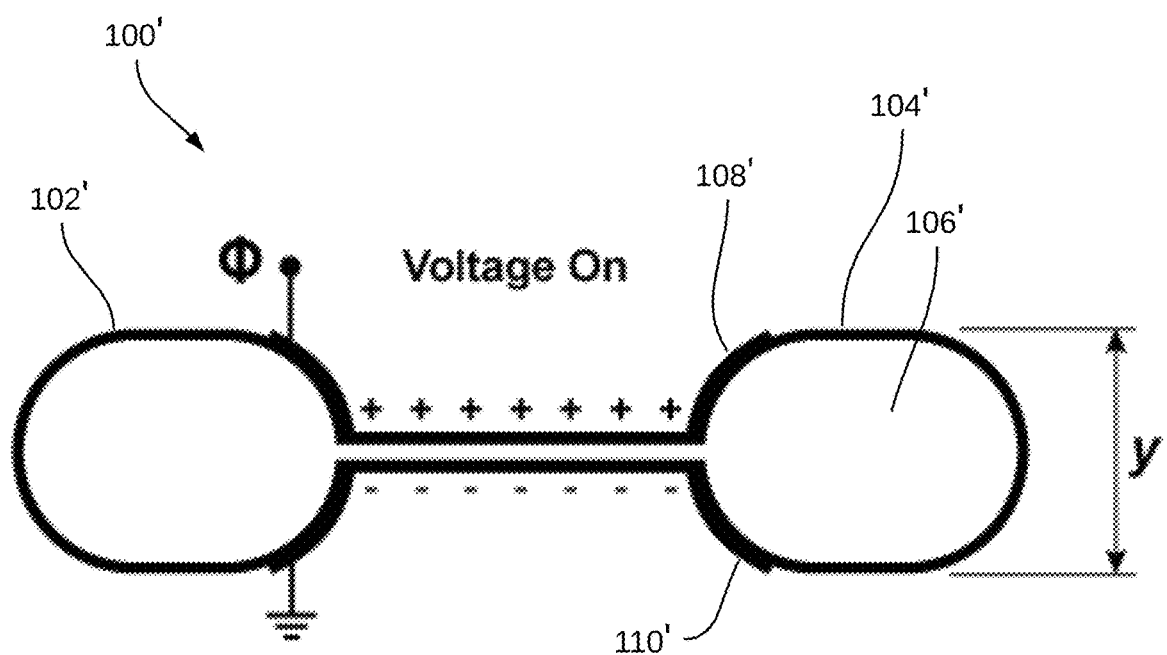

FIG. 1 shows a cross-section view of an embodiment of a HASEL actuator 100 which expands upon activation. This embodiment of the HASEL actuator includes one or more pouches 102, 104 made from dielectric film and filled with a fluid dielectric 106. Two electrodes 108, 110 are disposed on the outside of the dielectric film pouch. A first electrode 108 may be positioned substantially opposite the second electrode 110 as shown. FIG. 1A shows the actuator 100 in an off-state. In the off-state, no voltage is applied to the actuator and the electrodes generally conform to the resting shape of the pouch. FIG. 1B shows the actuator 100' in an on-state. Voltage is applied to one of electrodes 108', 110' causing the two electrodes to draw together. The electrodes draw together, or zip together, starting at the ends of the electrodes that are nearest each other and draw closer along the length. For example, on pouch 102', the electrodes 108', 110' zip together starting at a right side of the pouch and moving toward the left; on pouch 104', the electrodes 108', 110' zip together starting at a left side of the pouch and moving toward the right. As the electrodes pull together, dielectric fluid 106' is displaced toward one side of the pouch causing the pouch to form a more circular or bulbous pocket at one end. The height of the actuated pouch is shown as y in FIG. 1B; on-state height y is greater than the off-state height, or initial height, y0 shown in FIG. 1A. The on-state height y may be a function of a load F applied to the actuator (e.g., an external load that resists an increase in height y) and the applied voltage. These factors may determine the length that the electrodes that zip together, and correspondingly, how much dielectric fluid is displaced.

FIG. 2 shows multiple HASEL actuators 100 stacked on top of each other to create a system 200 of HASEL actuators. Stacking actuators in this manner increases the actuation stroke (i.e., the change in height represented by the equation y−y0) and the actuation stroke is proportional to the number of HASEL actuators in the stack. The electrical potential of adjacent electrodes may be the same in order to prevent dielectric breakdown between actuators in the stack. FIG. 2A shows the actuator system 200 in an off-state having a height of y1; FIG. 2B shows the actuator system 200' in an on-state having a height of y2. The difference between the on-state height and the off-state height (i.e., y2−y1) is the actuation stroke. As discussed above, the actuation stroke may be a function of an external load applied to the actuator system 200' and/or a voltage applied to the system.

Figure 3B:
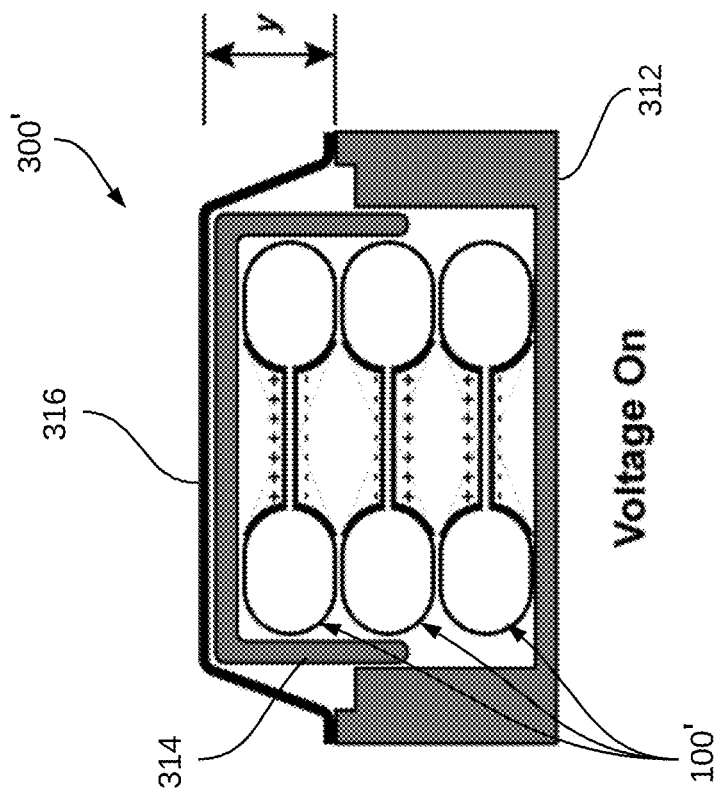
FIGS. 3A-3B illustrate a cross section view of a system of HASEL actuators having at least one actuator inside a chamber designed to withstand shear forces while allowing vertical displacement, in accordance with an embodiment.
Figure 3A:
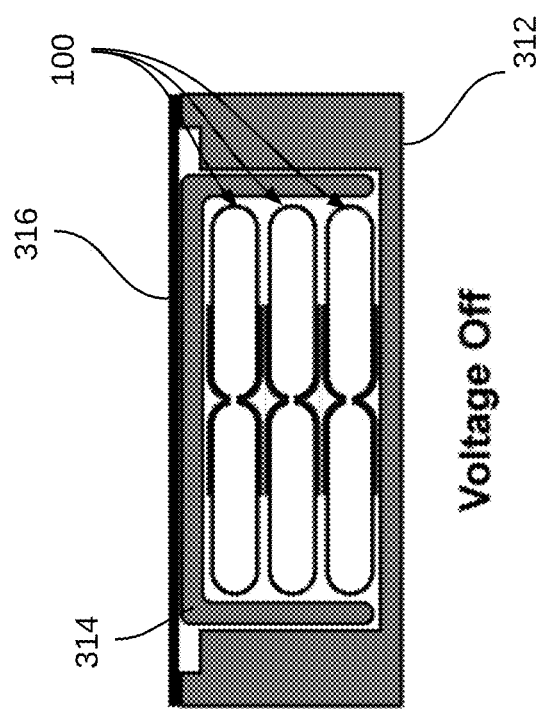

FIG. 3 illustrates a system 300 in which a HASEL actuator is placed inside of a housing specifically designed for use as a conveyor brake in which the conveying system can be a roller which is gravity feed, belt-driven live roller, motorized driven roller, segmented roller, and/or spherical ball roller. At least one HASEL actuator 100 is placed inside of housing 312 which can be either a rigid or flexible structure which has a cup or moveable secondary housing 314 all enclosed in a deformable membrane 316. The HASEL actuator is activated electrically, as shown in the system 300' illustrated in FIG. 3B, causing a displacement change of at least one of the actuators 100' which leads to the membrane 316 deforming and the cup 314 sliding vertically inside of the housing 312. The housing 312 and cup 314 are designed in such a way as to support shear force along the horizontal axis of the actuator while allowing for displacement along the vertical axis. In this embodiment, vertical displacement y and normal force depend on voltage applied to the HASEL actuators.

Figure 4:
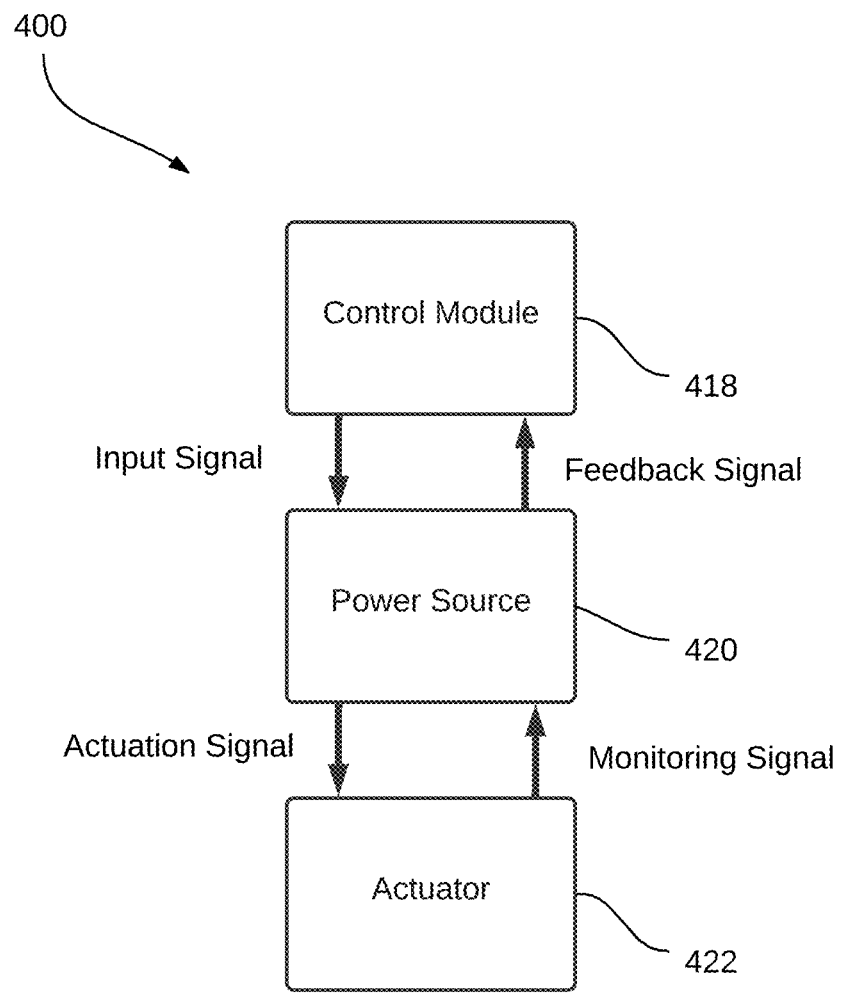
FIG. 4 illustrates a schematic representation of a HASEL actuator control system, in accordance with an embodiment.

FIG. 4 shows a schematic drawing of a system 400 having a control module 418 operatively coupled with a power source 420. The power source 420 is coupled with the HASEL actuator 422. The control module may send a signal instructing the power source to provide an actuation signal to the HASEL actuator. Variation in the actuation signal may be detected at a monitoring signal which may provide information about displacement, force, speed, whether or not the actuator is functioning properly, and/or other conditions within the HASEL actuator and/or conveyor system. The monitoring signal may be relayed back to the control module through a feedback signal. The control module may be configured to calculate a new instruction signal based on the feedback signal. Thus, a closed-loop feedback mechanism may be used to monitor and operate conveyor systems disclosed herein.

Figure 5:
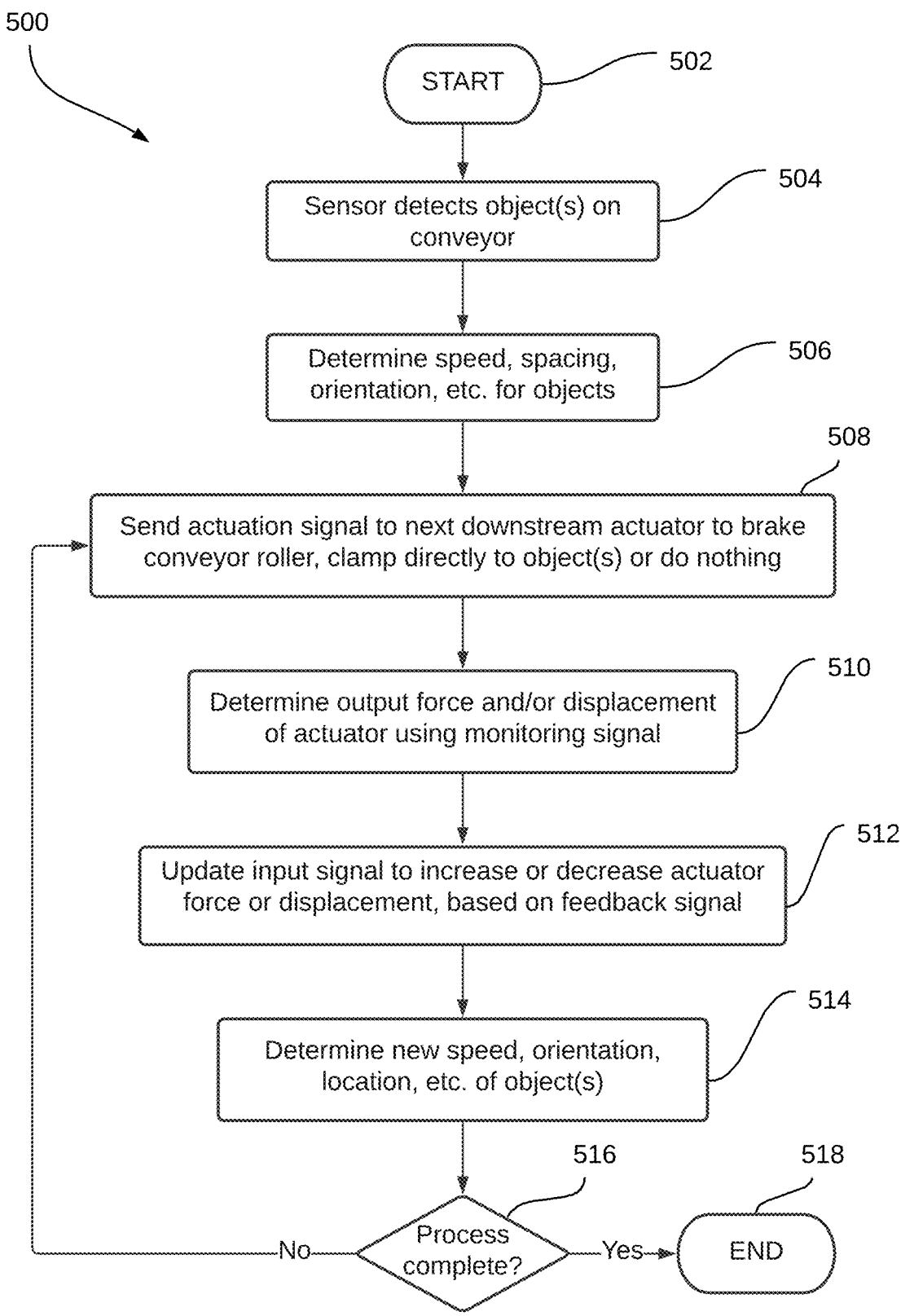
FIG. 5 illustrates a flow diagram for a method of controlling one or more HASEL powered conveyor brakes in conjunction with a conveying system designed to meter objects disclosed herein, in accordance with an embodiment.

FIG. 5 illustrates a process flow 500 for the control of an object moving through a conveyor system activated by HASEL actuators starting at step 502. As an object moves through the conveying system, sensors or HASEL actuators will be used to determine the presence of one or more objects on the conveyor (step 504) as well as information about the objects including but not limited to speed, orientation, and/or spacing (step 506). A control system uses this information to inform one or more HASEL actuators to move to influence the conveyor system or objects in a desired manner (step 508). Examples of reactions could include but are not limited to clamping a conveyor roller, directly clamping an object, applying some force to the conveyor roller or object to reduce the speed of the object, or remaining in a rest state to allow the object to maintain speed, orientation, or spacing. The HASEL actuator can use feedback information to monitor the state of the actuator in terms of force and displacement, and to infer information about the object based on this feedback (step 510). Adjustments of the actuation signal are made to tune the desired response of both the actuator as well as the path, position, or other details of the object (step 512). The resulting influence of the HASEL actuator on the object can be determined both directly by the HASEL actuator feedback as well as external sensors (step 514). As the object moves along the conveyor system, the system may determine whether the conveying process is complete at decision block 516. If the answer is yes, the process ends at step 518. If the answer is no, one or more of steps 508-516 are repeated to continually adjust object parameters such as speed, orientation, and spacing.

FIG. 6 illustrates the fundamental principles of using a HASEL actuator to control the rotational speed of a conveyor roller. In this figure only a basic gravity-fed roller system is demonstrated, however the HASEL actuator can be implemented in a similar manner in other conveyor systems such as a live roller, belt-driven roller, or other systems. Furthermore, in this figure and all subsequent figures, the labeled HASEL actuator could include a single HASEL actuator, multiple HASEL actuators, and may or may not include a housing or membrane as shown in FIG. 3. For example, an alternative interface between the HASEL actuator and the conveyor component may be developed or the HASEL actuator may contact a conveyor component directly.

Figure 6A:
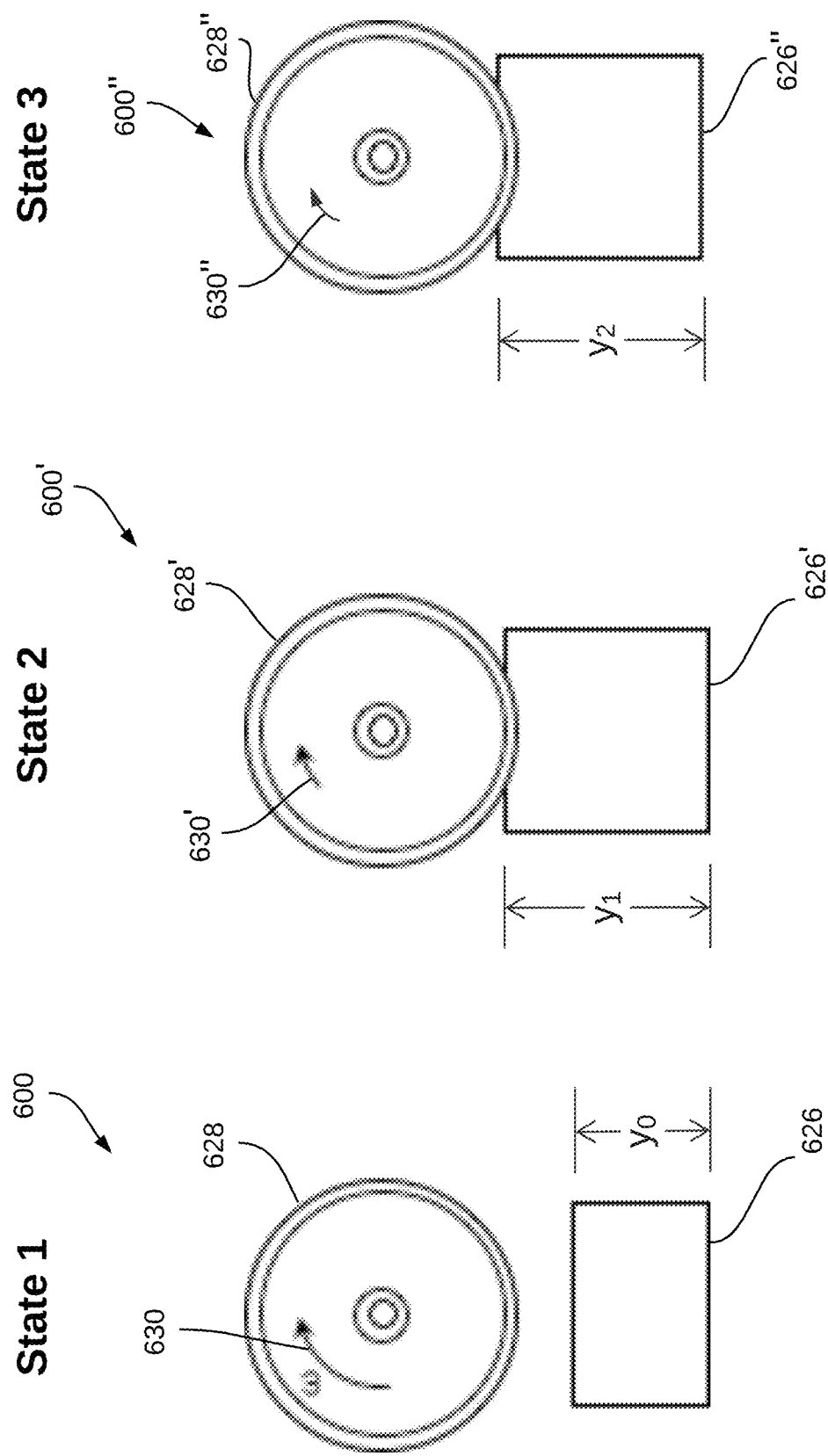
FIGS. 6A-6D Illustrate the use of a HASEL actuator to influence the speed of the roller and bearing system used to move an object by direct physical contact with the roller, in accordance with an embodiment.

FIG. 6A shows "State 1" where a system 600 includes a HASEL actuator 626 positioned under a roller 628 which is spinning at an initial speed, ω, represented by arrow 630, about an axis (i.e., an axis into the page). The HASEL actuators 626 are in an off-state and have an initial height of y0. In "State 2," system 600' shows an actuated HASEL actuator 626' having a height y1 which causes the actuator 626' to move into contact with the roller 628. The force exerted on the roller by the actuated HASEL actuator 626', "Force 1," may reduce the rotational speed of the roller such that speed 630' is less than speed 630. Force 1 may result in a frictional force being applied to the roller in a direction opposite the rotation of the roller. In "State 3," the voltage applied to the HASEL actuator 626" has been changed to adjust an actuated height y2, which may be less than or greater than height y1. Accordingly, the actuator 626" may exert a different force, "Force 2," on the roller which may be less than or greater than Force 1. Speed 630" may be correspondingly less than or greater than speed 630'. In an example, Force 2 may be sufficient to stop the motion of the roller altogether such that speed 630' is essentially zero.

Figure 6B:
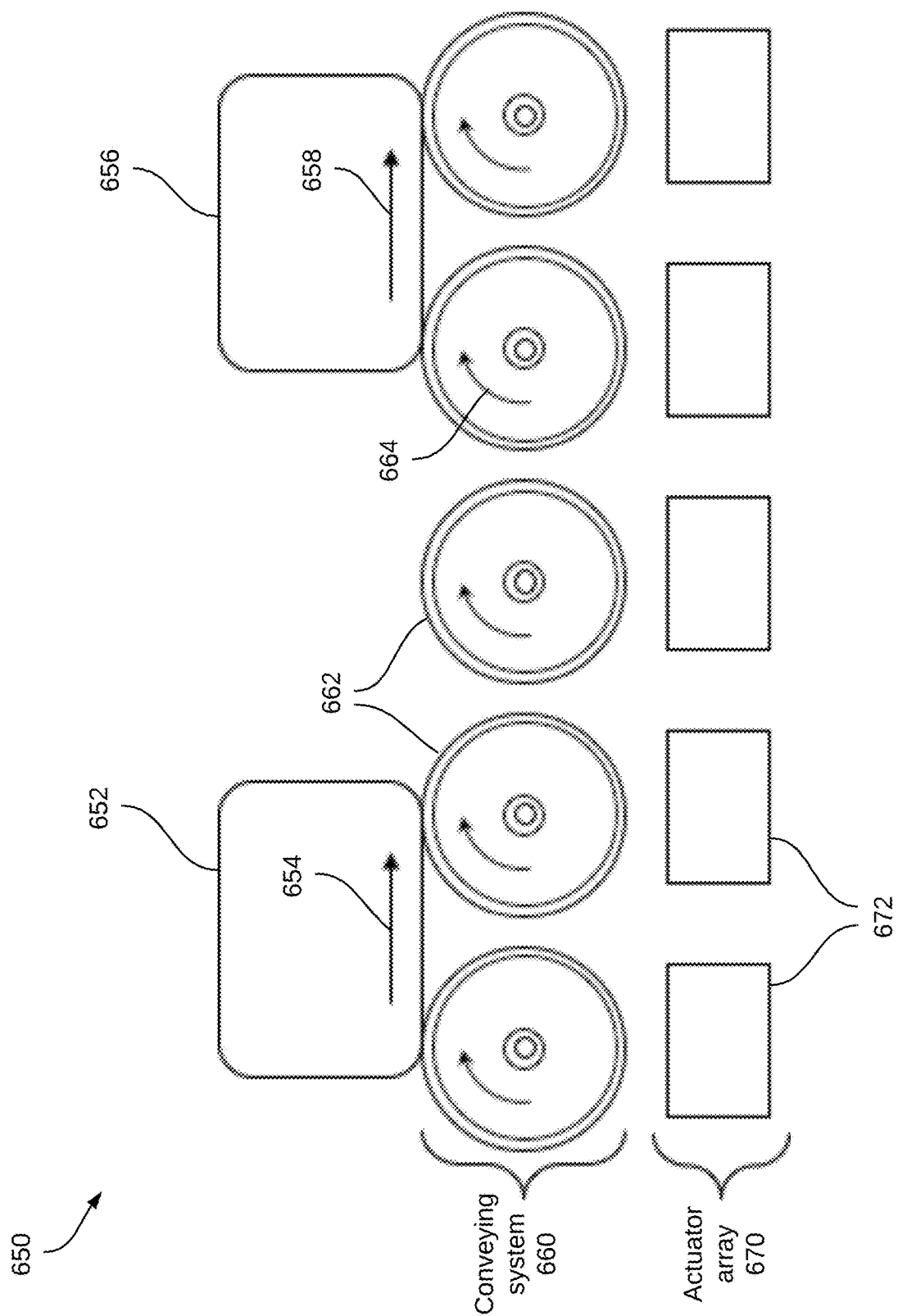
Figure 6C:
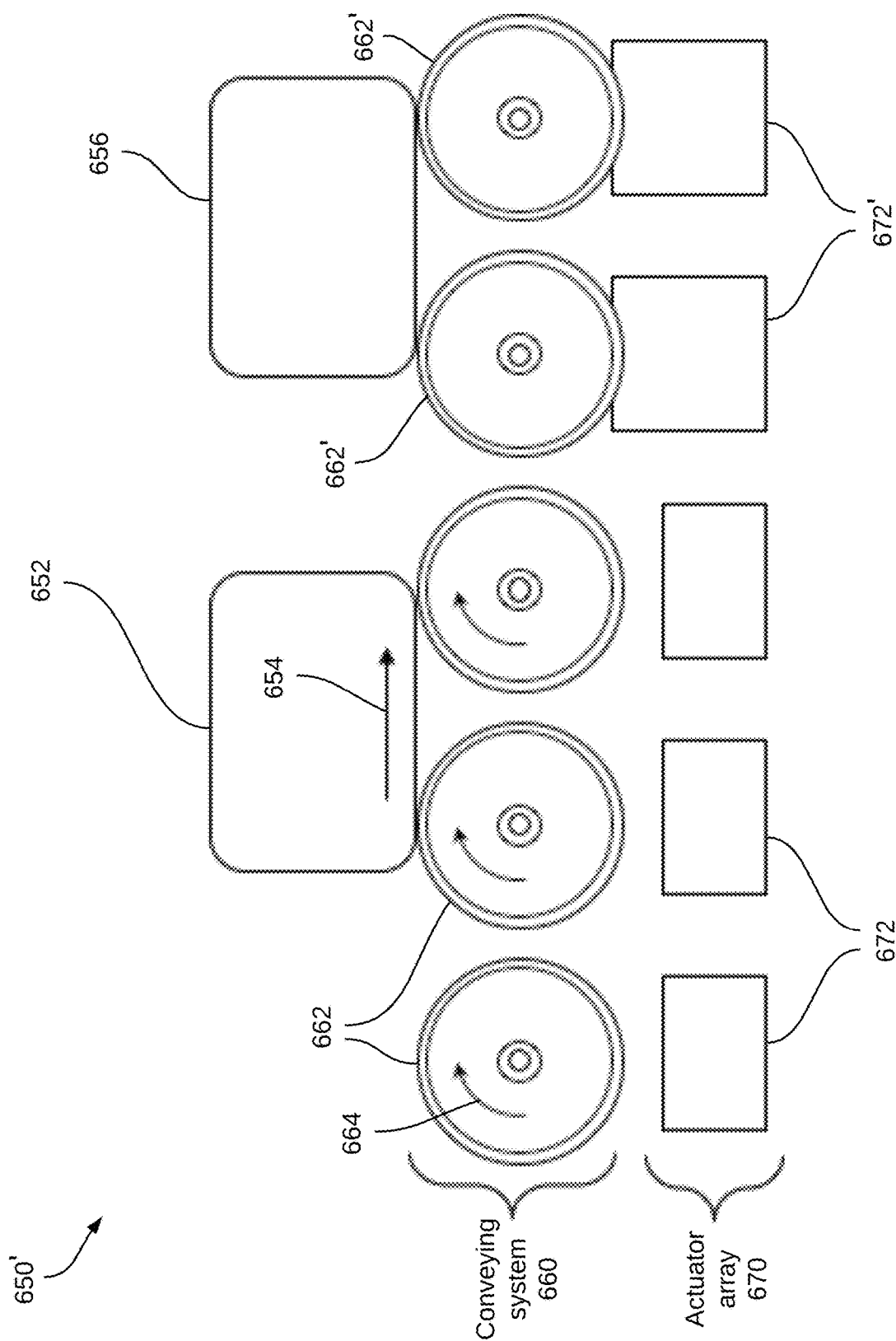
Figure 6D:
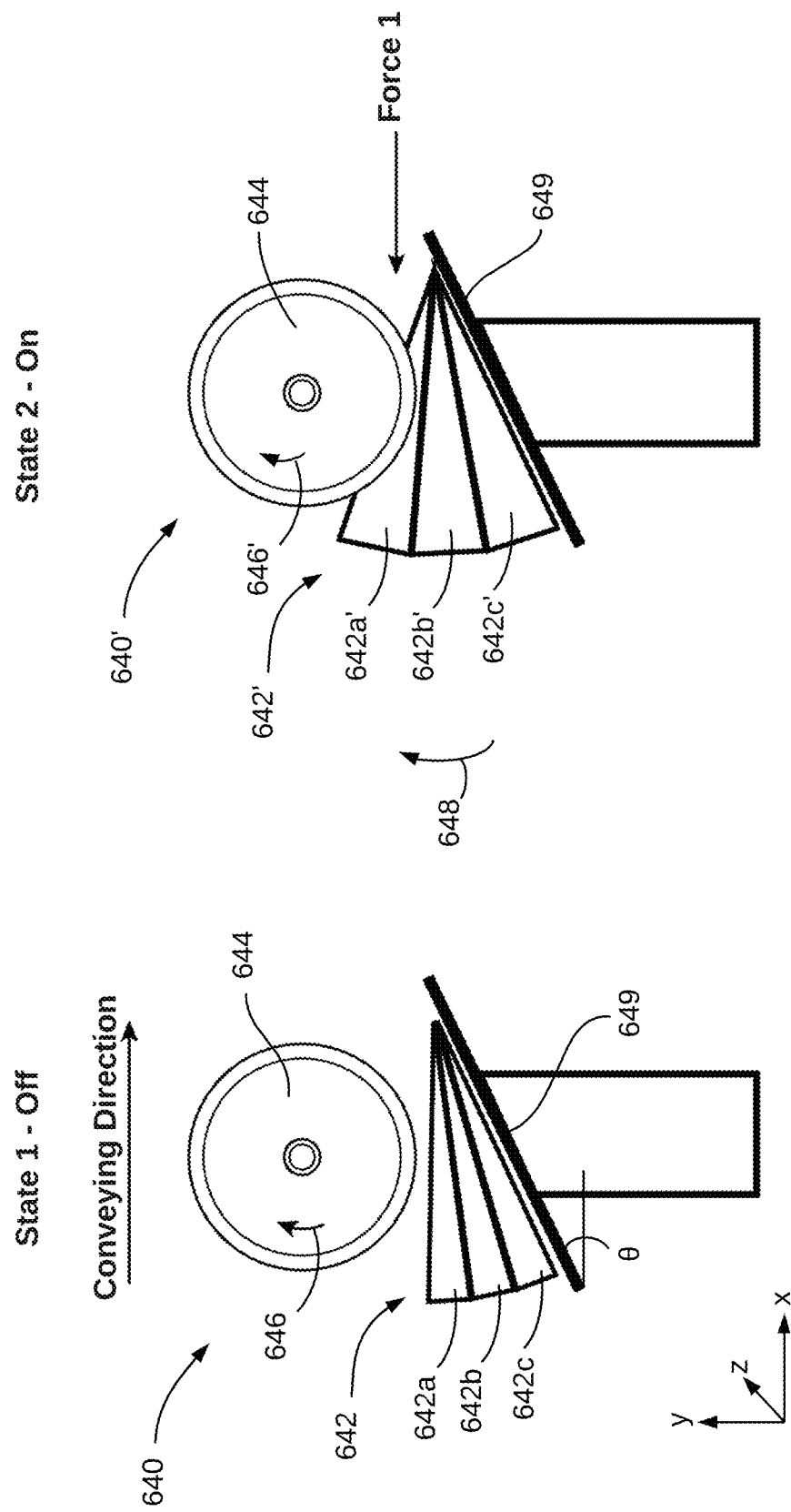

FIG. 6D shows a side view of a system 640 including a stack of HASEL actuators 642, made up of individual HASEL actuators 642a, 642b, 642c, positioned under a roller 644. While three individual HASEL actuators are shown, more or fewer actuators may be included within the stack 642 without departing from the scope of the present application. In "State 1" of system 640 illustrated in the left panel, the HASEL actuators are not actuated and the roller 644 is spinning at an initial angular speed $\omega_0$, represented by arrow 646, about an axis (i.e., an axis along the z-direction into the page). The individual HASEL actuators 642a, 642b, 642c within the stack 642 have been adhered or clamped together on one side (e.g., the right side as shown) to partially constrain movement of the actuators. Selective actuation of the constrained actuators produces asymmetric expansion (e.g., a tilting or rotating motion as represented by arrow 648 in the right panel) instead of symmetric linear expansion (e.g., in ithe y-direction) as would be produced under actuation if the individual actuators were not constrained. The actuators may be mounted on a platform 649 with adjustable height (e.g., in the y-direction) and an adjustable angle θ.

In "State 2," illustrated in the right panel, the system 640' includes the stack of HASEL actuators 642' in an actuated state such that they have asymmetrically expanded in a tilting or rotating motion represented by arrow 648. At least a portion of the HASEL actuator 642a' nearest the roller 644 is in direct contact with the roller 644. The force exerted on the roller 644 by the actuated stack of HASEL actuators 642', labeled "Force 1," may reduce the rotational speed ω of the roller, represented by arrow 646', such that speed ω of the roller 644 is less than speed $\omega_0$. In some embodiments, the speed ω may be zero when the actuators 642' completely stop the rotation of the roller 644. The amount of asymmetric expansion of the stack of HASEL actuators may be adjusted to vary the magnitude of Force 1 and the magnitude of speed ω. Force 1 is the result of a frictional force being applied to the roller 644 in a direction opposite the rotation of the roller. Because the HASEL actuators 642a', 642b', 642c' have been adhered together or otherwise constrained on one side, they are able to support the frictional force applied by the conveyor roller 644 without the need for a housing (e.g., housing 300 described above). Notably, at least one of the HASEL actuators (e.g., 642a') within the actuated stack 642' may include a flexible shell such that the actuator is able to conform to the shape of the roller 644. Thus, instead of providing only a single contact point between the actuator and the roller, Force 1 may be applied over a larger surface area to gain additional control over the roller speed and to spread wear of the actuator shell over a larger area for improved braking control and durability.

FIG. 6B shows a side view of an assembly 650 including objects 652, 656 moving along a conveying system 660. In this illustration, the conveying system 660 shows five rollers 662, all rotating at the same speed 664. With the help of the roller 662, two objects 652, 656 are moving along the conveying system. An array 670 of HASEL actuators 672 are positioned beneath the rollers 662. In the example shown, there is a single HASEL 672 actuator for each roller 662. The HASEL actuators can be controlled independently to selectively engage rollers and vary the rotational speed 664 of one or more rollers. Adjusting the speed 664 of the rollers also adjusts the speeds 654, 658 of the first and second objects 652, 656, respectively.

FIG. 6C illustrates an example configuration 650' where two HASEL actuators 672' are activated and pressing against two rollers 662'. In this case, the HASEL actuators 672' have stopped the rollers 662' from rotating which prevents Object 2 656 from continuing through the conveying system 600. In other configurations, the force applied by the HASEL actuators can be adjusted such that the rollers still rotate but at a slower speed in order to reduce the speed of objects on the conveying system.

FIG. 7 illustrates the fundamental principles of using a HASEL actuator to directly interact with objects moving through a conveying system.

Figure 7A:
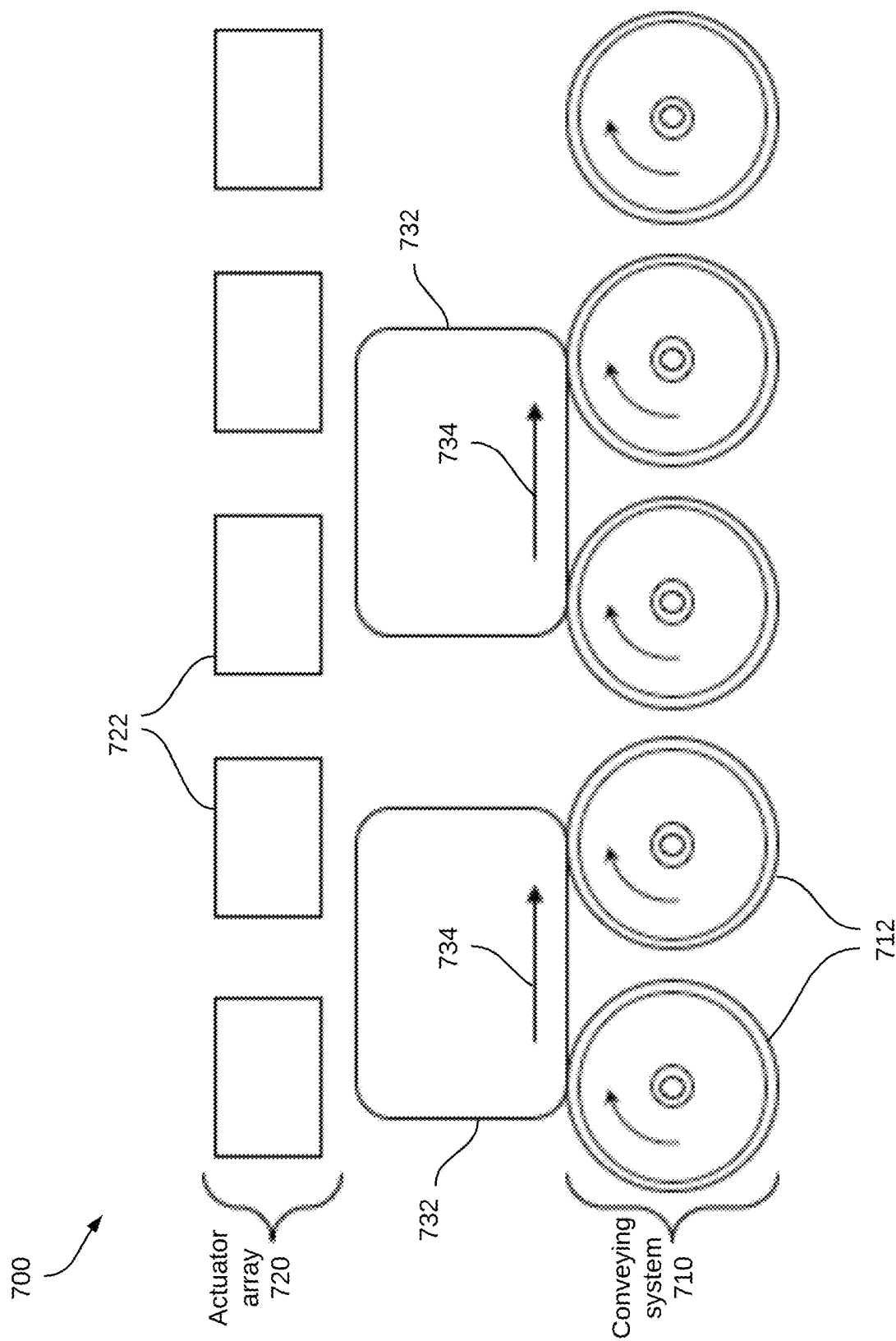
FIGS. 7A-7B illustrate the use of at least one HASEL actuator to influence the speed of an object on a conveyor system by direct physical contact with the object from the top, in accordance with an embodiment.

FIG. 7A shows a side view of an assembly 700 including objects 732 moving at a speed and in a direction 734 along a conveying system 710. In the example shown, the conveying system 710 includes five rollers 712, all rotating at the same speed. With the help of the roller, two objects 732 are moving along the conveying system 710. An array 720 of HASEL actuators 722 are positioned above the objects 732 on the conveying system 710. In the embodiment shown, there is a single HASEL actuator 722 for each roller 712. The HASEL actuators can be controlled independently to selectively interact with objects.

Figure 7B:
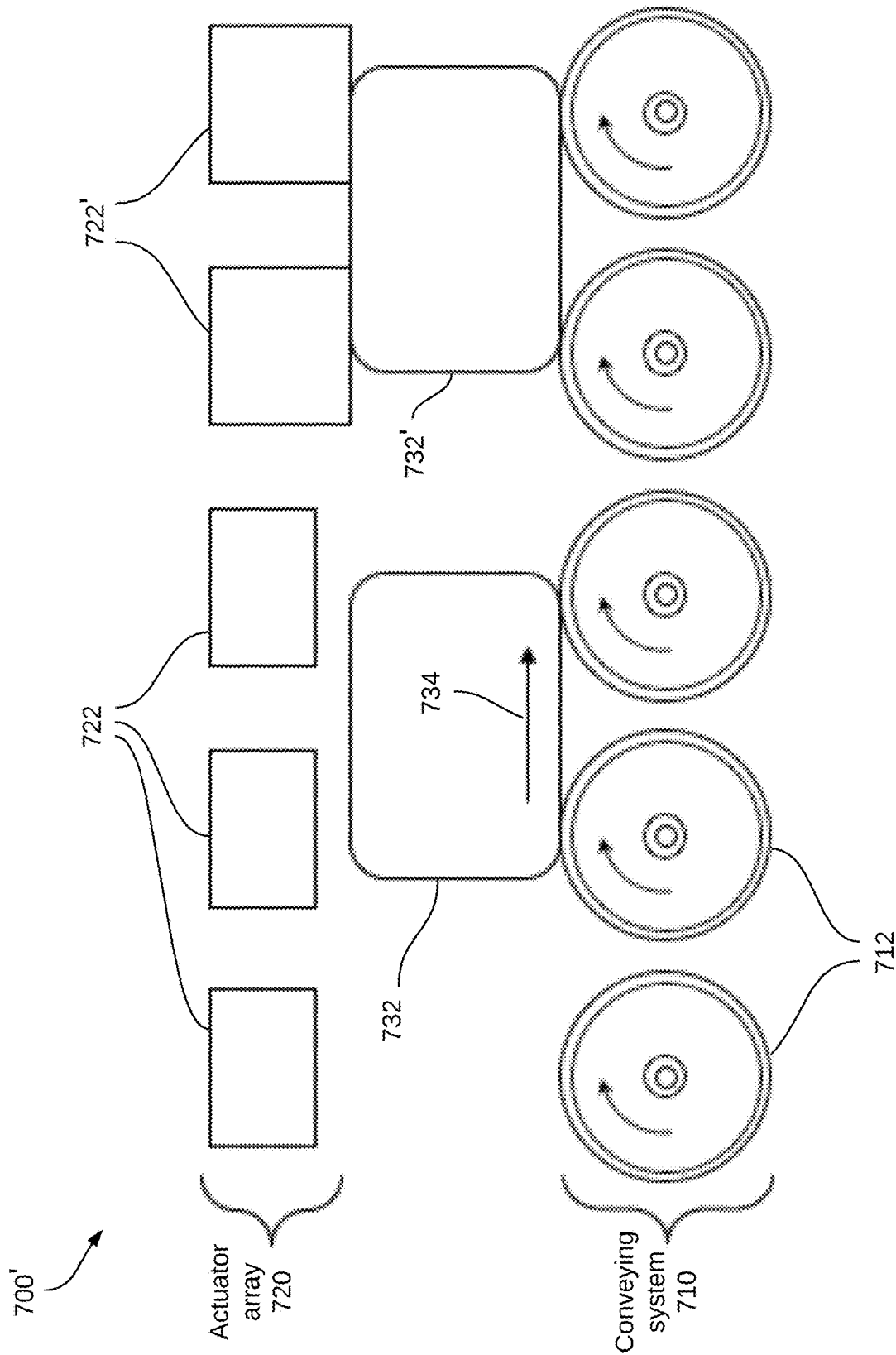

FIG. 7B illustrates an example system configuration 700' where two HASEL actuators 722' have been actuated to expand and are acting against Object 2 732' while HASEL actuators 722 have not been actuated. In this case, the HASEL actuators 722' have stopped Object 2 732' from continuing through the conveying system 710. In some embodiments, the force applied to the objects by the HASEL actuators can be adjusted such that the speed of the object is reduced but not stopped. In some embodiments, adjacent HASEL actuators can apply gradually more force to an object as it passes by on the conveying system such that the object is gradually slowed or brought to a stop or gradually allowed to increase in speed.

FIG. 8 illustrates a system configuration 800 and a method of using one or more HASEL actuators 822 from the side to directly interact with objects 832 moving through a conveying system. The conveying system may include multiple rollers 812 configured to rotate on bearings 814. In this case, HASEL actuators 822 are located on either side of the width of the rollers 812. FIG. 8A shows an object moving along the conveyor roller with the object positioned in the center of the roller and HASEL actuators on either side are at rest with a width represented by x0. In the configuration 800' illustrated in FIG. 8B, both HASEL actuators 822' are activated such that they have an increased width represented by x1 and are able to clamp the object 832' therebetween. Depending on force applied by the HASEL actuators, the object 832' stops completely or moves at a slower speed. As shown in the configuration 800" illustrated in FIG. 8C, activating a single HASEL actuator 822" will move the object 832" from the center to the left side of the roller 812. Thus, selectively actuating one or more HASEL actuators can engage an object to change its position and/or speed.

Figure 8A:
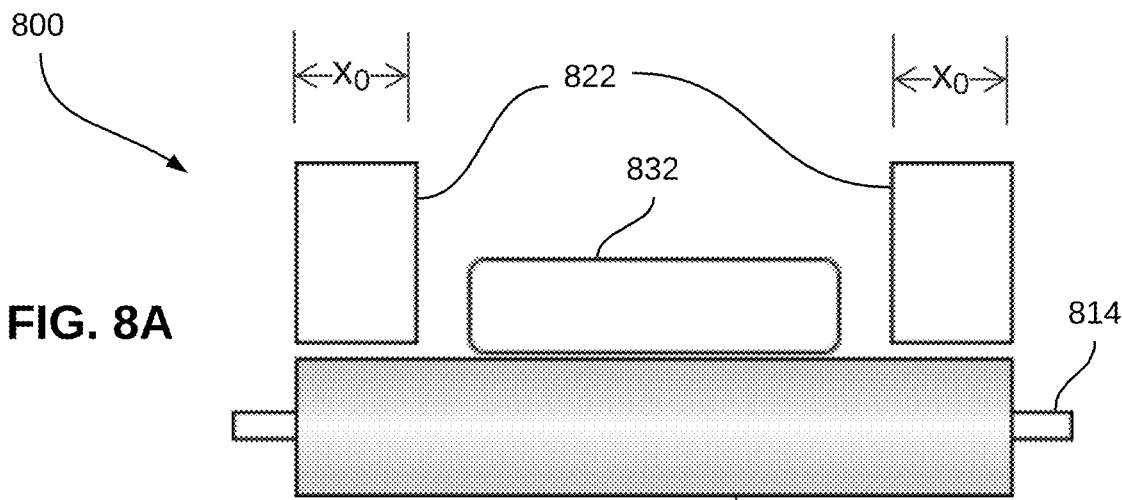
FIGS. 8A-C illustrate the use of at least one HASEL actuator to influence the position or speed of an object on a conveyor system by direct physical contact with the object from the side, in accordance with an embodiment.
Figure 8B:
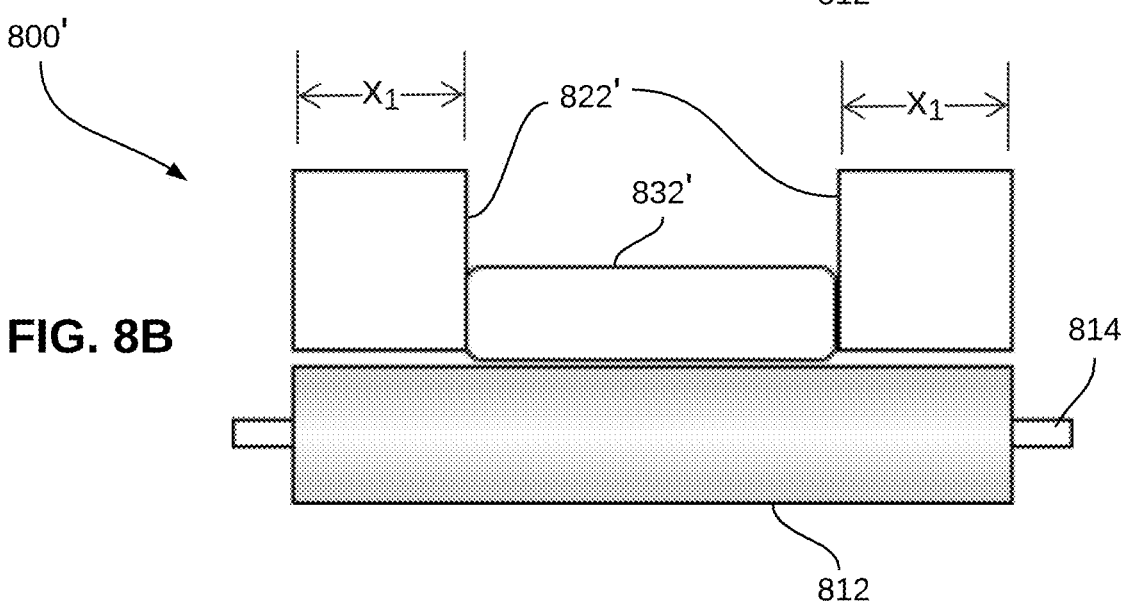
Figure 8C:
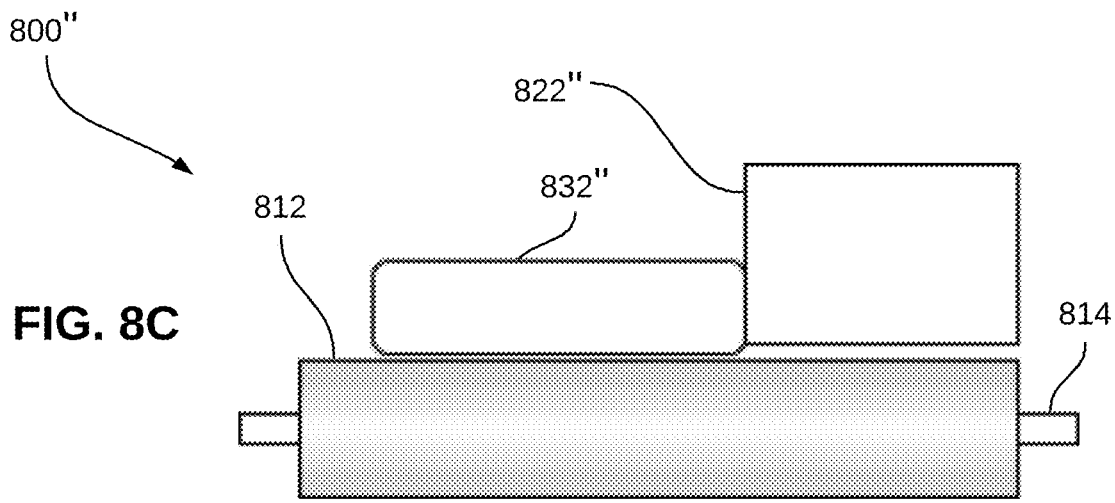
Figure 8D:
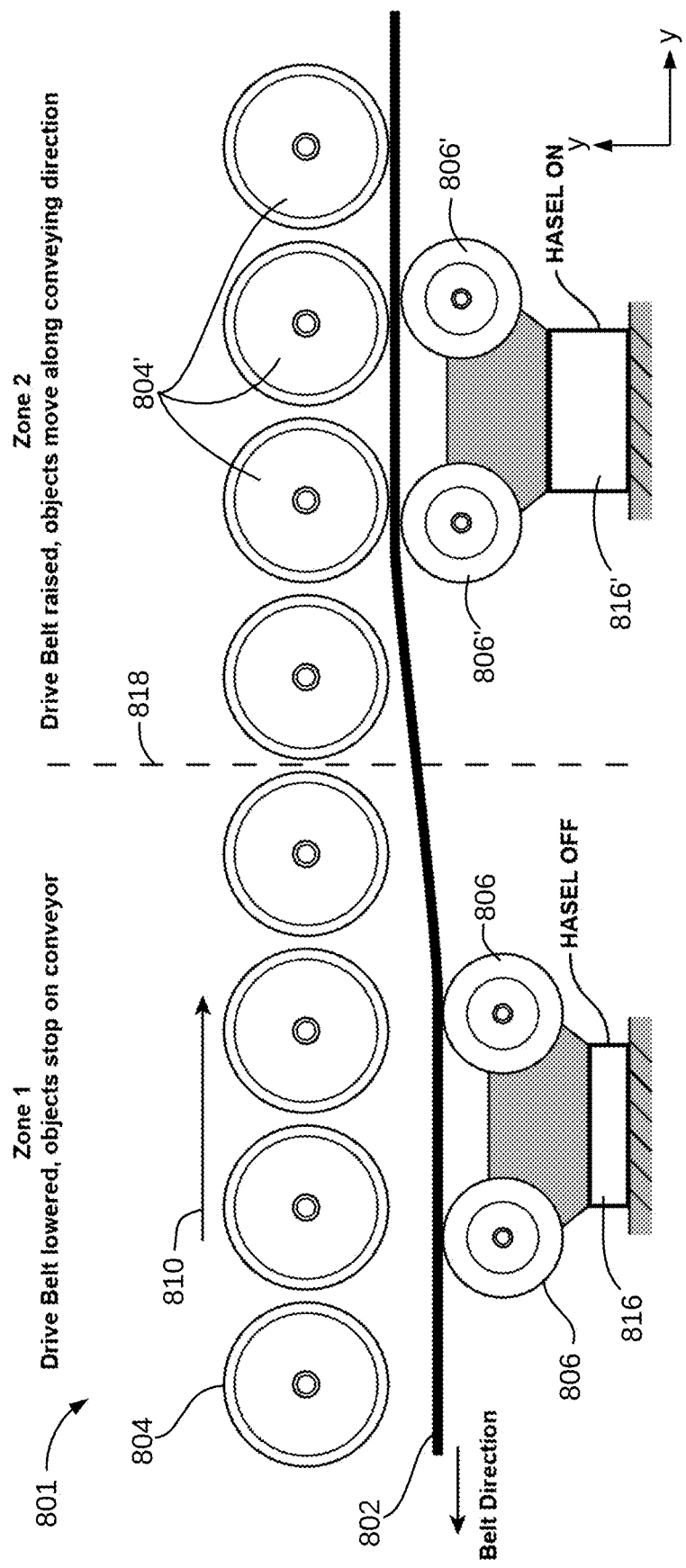
FIGS. 8D-8E illustrate the use of at least one HASEL actuator to influence the speed of zones within a belt-driven conveyor system by engaging or disengaging a drive belt, in accordance with an embodiment.
Figure 8E:
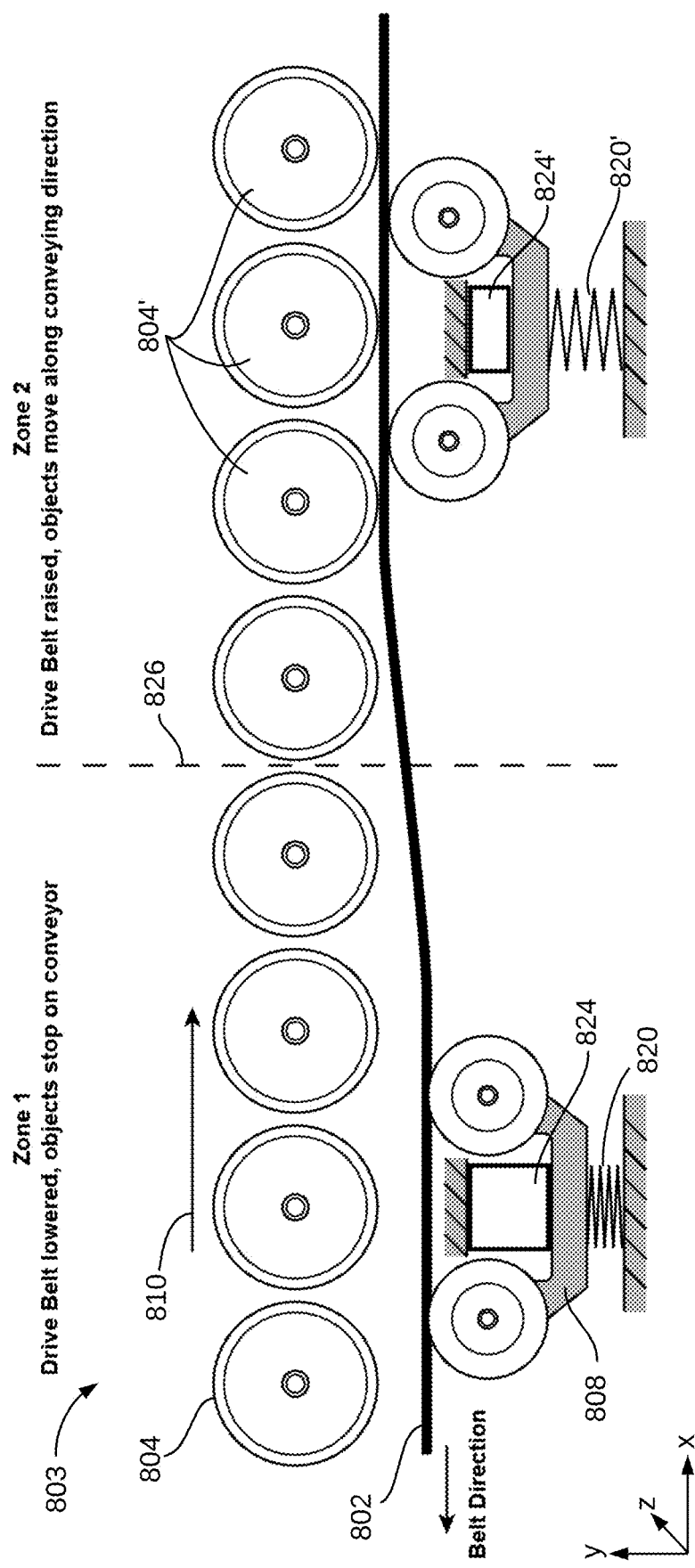

FIGS. 8D-8E illustrate the fundamental principles of using HASEL actuators to control zones of a belt-driven conveyor by engaging and disengaging a drive belt. This is commonly referred to as a zero pressure accumulation conveyor and will consist of multiple zones that can be controlled independently. FIGS. 8D-8E show side views of a conveyor assembly 801, 803, respectively, which are driven by a belt. The drive belt 802 is located beneath the conveyor rollers 804 and is constantly moving. Pressure rollers 806, 808 shown in FIGS. 8D and 8E, respectively, are used to push the drive belt 802 in contact with the conveyor rollers 804 which causes the conveyor rollers to rotate and move objects in the conveying direction 810. In some embodiments, the conveyor assemblies 801, 803 are divided into zones to selectively control the speed of objects moving through the conveyor system. Each zone has at least one pressure roller 804 which can be engaged or disengaged from the drive belt 802.

FIG. 8D illustrates a system 801 where HASEL actuators 816, 816' may be used to actively lift one or more pressure rollers and portions of a drive belt into contact with the conveyor rollers 804. In Zone 1 illustrated to the left of dashed line 818, the HASEL actuators 816 are off and the pressure rollers 806 coupled with the HASEL actuators 816 are in a retracted position. As a result, the portion of the drive belt 802 located in Zone 1 is not forced into contact with the conveyor rollers 804 by the pressure rollers 806. Thus, the conveyor rollers 804 are not driven to rotate and any objects located on the conveyor rollers 804 in Zone 1 do not move in the conveying direction 810. In Zone 2 illustrated to the right of the dashed line 818, the HASEL actuators 812' are on and are expanded in a y-direction such that the pressure rollers 806' coupled with the HASEL actuators 816' are also moved in the y-direction such that they are in an active position. In the active position, the pressure rollers 806' cause the portion of the drive belt 802 located above the pressure rollers 806' (e.g., in Zone 2) to come into contact with the conveyor rollers 804', which causes objects on the conveyor rollers 804' to move in the conveying direction 810.

While two pressure rollers are shown per HASEL actuator, one of skill in the art will appreciate that more or fewer pressure rollers per HASEL actuator may be used. Additionally, spacing between pressure rollers and between adjacent HASEL actuators (e.g., the size of zones) may be adjusted without departing from the scope of the present application. In some embodiments, the expansion of the HASEL actuators from an off position (as shown in Zone 1) and an on position (as shown in Zone 2) may be between approximately 0 and approximately 100 cm. In some embodiments, the expansion may be between approximately 0.1 cm and approximately 20 cm or between approximately 0.5 cm and approximately 5 cm.

FIG. 8E illustrates a system 803 where a HASEL actuator is used to actively lower the pressure roller and disengage the drive belt from the conveyor rollers. In this system 803, a spring is configured to push against one side of the pressure roller and a HASEL actuator is configured to act on a side of the pressure roller that is opposite of the spring. For example, when the expanding HASEL actuator 824 is on, as shown in Zone 1 on the left side of the dashed line 826, the spring 820 (e.g., a compression spring) is compressed and pressure rollers 808 located between the HASEL actuator 824 and the spring 820 are lowered (e.g., moved in the −y-direction) into retracted position. The drive belt 802 is disengaged from the conveyor rollers 804 and the conveyor rollers 804 are not driven to rotate. Conversely, when the HASEL actuator 824' is off, as shown in Zone 2 illustrated to the right of dashed line 826, the spring 820' is allowed to extend, causing the portion of the drive belt 802 in Zone 2 into contact with the conveyor rollers 804'. In Zone 1, the HASEL actuators 824 are on and objects do not move in the conveying direction 810. In Zone 2, the HASEL actuators 824' are off which engages the drive belt 802 with the conveyor rollers 804' and causes objects to move in the conveying direction 810. For the system 803, the resting state position is when the spring 820 is extended and the drive belt 802 is in contact with the conveyor rollers 804'. Thus, if the HASEL actuators 824, 824' break or lose power, objects on the conveyor rollers 804, 804' will continue to move along the conveying direction 810. In some embodiments, the spring may be a compression spring having a spring constant between approximately 1 and approximately 1,000 N/m.

FIG. 9 illustrates a front view of a conveying system 900 in which one or more regions of the conveying system can be independently influenced by one or more HASEL actuators 922 to adjust the speed of a region of the conveying system. Such a system allows for control of object speed (both linear and rotational), orientation, or spacing. In doing so the object being conveyed can be influenced to move in multiple directions across the conveying system.

Figure 10A:
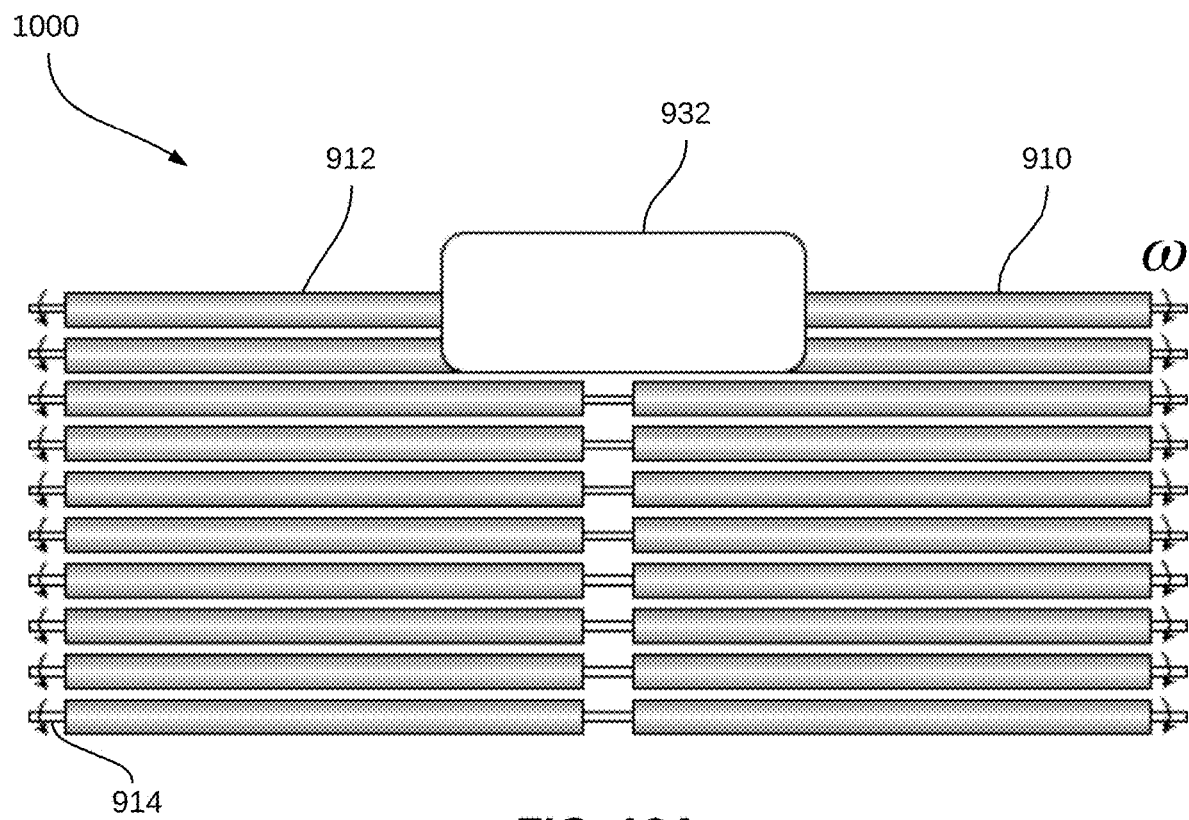
FIGS. 10A-10B illustrate the top view of the use of at least one HASEL actuator set of HASEL actuators to influence a portion of a roller by direct contact with a portion of the roller, to rotate or move the object on the conveying surface, in accordance with an embodiment.
Figure 10B:
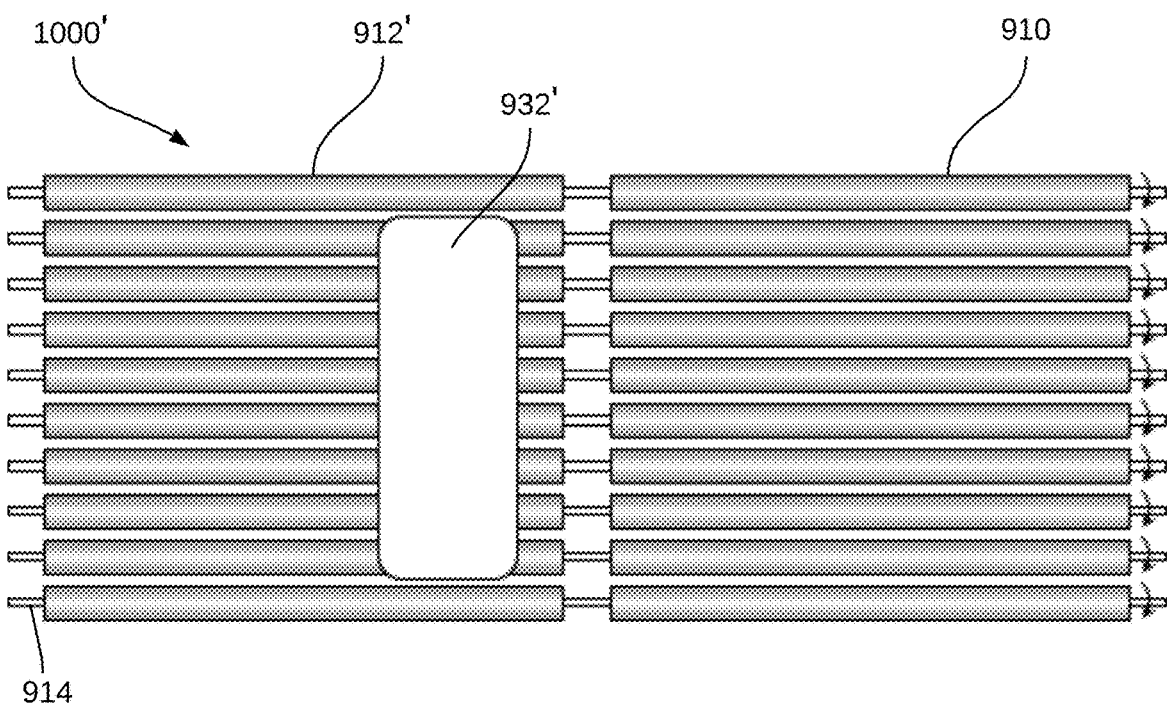

FIG. 9A shows the object 932 centered on a conveying system that includes two roller regions 910, 912 in the width direction (i.e., left to right in the illustration) where each roller is controlled independently using a HASEL actuator. Roller regions 910, 912 are configured to rotate about bearings 914. Along the length direction (i.e., into and out of the page in the illustration), every roller region 910, 912 may be controlled independently using a HASEL actuator 922. Orientation can be changed by selectively actuating one or more HASEL actuator 922, thereby controlling speed of roller regions 910, 912 as an object moves over the conveying system. For example, FIG. 9B shows conveying system 900' in which roller regions 912' on the left side of the conveyor are stopped by the HASEL actuators 922' and the roller regions 910 on the right side are still moving. In such a configuration, the object 932' will rotate when the portion of the object 932' on stopped roller region 912 stops moving but the portion of object 932' on roller region 910 continues to move. In this case the object 932' has rotated 90 degrees in the clockwise direction when the system 900' is viewed from the top. This concept can be extended to any number of regions of the conveying systems and any number of rollers with HASEL actuators to provide a highly granular conveying system capable of manipulating many objects. FIG. 10 illustrates the top views 1000, 1000' of the systems 900, 900', respectively, described with respect to FIG. 9.

FIG. 11 illustrates a top view of a conveying system 1100 where five rollers 1112 are illustrated in the width direction (i.e., left to right in the illustration) and each roller in the width direction is controlled independently with a HASEL actuator (not shown) similar to the embodiment described with respect to FIGS. 9A and 9B. Likewise, along the length conveying direction (i.e., top to bottom in the illustration), there are individual HASEL actuators to control each row of five rollers. This matrix of independently controlled rollers in a conveying system could be expanded to any number of M×N rollers depending on the desired level of control and granularity of the conveyor system. With such a matrix of independently controlled rollers, one or more objects on the entire conveying surface can be altered and redirected, enabling tasks such as singulation, diversion, and sortation.

FIG. 11A shows an example of multiple objects 1132 in a random order on the conveying system 1100. By selectively influencing the conveying system with multiple HASEL actuators, the location of objects 1132 can be altered as they move along the conveying system. The path of each object can be independently controlled to align or orient the objects in a desired manner. As shown in FIG. 11B, as the objects 1132' move down the conveyor system 1100', the rollers 1112' have been selectively controlled with HASEL actuators to organize the objects 1132' into a single, evenly spaced column on the conveyor system—this task is commonly referred to in logistics as "singulation." This concept can be extended to any number of regions of the conveying systems, any number of HASEL actuators, and any number of objects to provide a highly granular conveying system capable of manipulating many objects across many different directions.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

What is claimed is:

1. A system for selectively adjusting rotational speed of a roller, the system comprising:
    a first roller configured to rotate about an axis; and
    a first actuator configured to selectively expand into contact with the first roller, thereby applying a first friction force to resist rotation of the first roller about the axis,
    wherein the first actuator comprises:
    a compliant shell defining an enclosed cavity;
    a dielectric fluid disposed within the enclosed cavity;
    a first electrode disposed on a first side of the compliant shell; and
    a second electrode disposed on a second side of the compliant shell opposite the first side.

2. The system of claim 1, wherein the roller is selected from a group consisting of a gravity fed roller, a belt-driven live roller, a motorized driven roller, a segmented roller, and a spherical ball roller.

3. The system of claim 1, further comprising a second actuator configured to selectively expand into contact with the first roller, thereby applying a second friction force to resist rotation of the first roller about the axis.

4. The system of claim 1, further comprising a control module configured to modulate power to one of the first and the second electrodes and to receive feedback from at least one of the first and the second electrodes or an external sensor.

5. The system of claim 4, wherein the feedback relates to at least one selected from a group consisting of force applied by the first actuator, displacement of the first actuator, weight of the moving object, speed of the moving object, position, orientation, shape, and size of the moving object.

6. A system for manipulating moving objects, the system comprising:
    a first actuator configured to selectively expand into contact with a first moving object,
    wherein the first actuator comprises:
    a compliant shell defining an enclosed cavity;
    a dielectric fluid disposed within the enclosed cavity;
    a first electrode disposed on a first side of the compliant shell; and
    a second electrode disposed on a second side of the compliant shell opposite the first side.

7. The system of claim 6, further comprising a second actuator configured to selectively expand into contact with the first moving object, wherein the second actuator is opposite the first actuator.

8. The system of claim 6, further comprising a control module configured to modulate power to one of the first and the second electrodes and to receive feedback from the at least one of the first and the second electrodes or an external sensor.

9. The system of claim 8, wherein the feedback relates to at least one selected from a group consisting of force applied by the first actuator, displacement of the first actuator, weight of the moving object, speed of the moving object, position, shape, and size of the moving object.

10. A system for selectively controlling rotational speed of a conveyor roller, the system comprising:
    at least one conveyor roller;
    at least one pressure roller;
    a drive belt having a first side and a second side, wherein the first side faces the at least one conveyor roller and wherein the second side is in contact with the at least one pressure roller; and
    at least one actuator configured to selectively position the first side of the drive belt such that the first side of the drive belt contacts the at least one conveyor roller,
    wherein the actuator comprises:
    a compliant shell defining an enclosed cavity;
    a dielectric fluid disposed within the enclosed cavity;
    a first electrode disposed on a first side of the compliant shell; and
    a second electrode disposed on a second side of the compliant shell opposite the first side,
    wherein the actuator is configured to expand when a voltage is applied to the first electrode.

11. The system of claim 10, wherein the at least one actuator is configured such that when the voltage is applied to the first electrode, the first side of the drive belt is moved into contact with the at least one conveyor roller.

12. The system of claim 10, further comprising:
    a spring,
    wherein the spring is disposed on a first side of the at least one pressure roller and is configured to exert a first force in a first direction, and
    wherein the at least one actuator is disposed on a second side of the at least one pressure roller opposite the first side and is configured to selectively exert a second force in a second direction opposite the first direction.

13. The system of claim 12, wherein the actuator is configured to exert the second force when the voltage is applied to the first electrode.

14. The system of claim 12, wherein the spring is configured to position the first side of the drive belt such that the first side of the drive belt is in contact with the at least one conveyor roller when the at least one actuator is off.

* * * * *